US011420904B2

(12) United States Patent
De Luca et al.

(10) Patent No.: US 11,420,904 B2
(45) Date of Patent: Aug. 23, 2022

(54) COMPOSITE MATERIAL

(71) Applicant: IMPERIAL COLLEGE OF SCIENCE, TECHNOLOGY AND MEDICINE, London (GB)

(72) Inventors: Francois De Luca, London (GB); Milo Sebastian Peter Shaffer, London (GB); Alexander Bismarck, London (GB)

(73) Assignee: IMPERIAL COLLEGE OF SCIENCE, TECHNOLOGY AND MEDICINE, London (GB)

( * ) Notice: Subject to any disclaimer, the term of this patent is extended or adjusted under 35 U.S.C. 154(b) by 400 days.

(21) Appl. No.: 16/469,631

(22) PCT Filed: Dec. 15, 2017

(86) PCT No.: PCT/GB2017/053757
§ 371 (c)(1),
(2) Date: Jun. 13, 2019

(87) PCT Pub. No.: WO2018/109486
PCT Pub. Date: Jun. 21, 2018

(65) Prior Publication Data
US 2020/0239363 A1 Jul. 30, 2020

(30) Foreign Application Priority Data
Dec. 16, 2016 (GB) .................................... 1621494

(51) Int. Cl.
*C08J 5/08* (2006.01)
*C03C 25/28* (2018.01)
(Continued)

(52) U.S. Cl.
CPC .............. *C03C 25/28* (2013.01); *C03C 25/47* (2018.01); *C08J 5/08* (2013.01); *D06M 11/50* (2013.01); *D06M 11/55* (2013.01)

(58) Field of Classification Search
CPC ....... C03C 25/28; C03C 24/47; C03C 25/285; C08J 5/08; D06M 11/50; D06M 11/55
(Continued)

(56) References Cited

U.S. PATENT DOCUMENTS 9,023,478 B2 * 5/2015 Lee ........................ B82Y 40/00
428/408
10,343,185 B2 * 7/2019 Grunlan ................ D06M 10/02
(Continued)

FOREIGN PATENT DOCUMENTS

CN 103757876 A 4/2014
KR 10-1436500 B1 10/2014
(Continued)

OTHER PUBLICATIONS

Bonderer et al., "Bioinspired Design and Assembly of Platelet Reinforced Polymer Films", Science, vol. 319, Feb. 22, 2008, pp. 1069-1073.
(Continued)

*Primary Examiner* — Hannah J Pak
(74) *Attorney, Agent, or Firm* — Squire Patton Boggs (US) LLP

(57) ABSTRACT

A coated fibre comprising a fibre and a coating, wherein the coating comprises nanoplatelets and a polymer, wherein the coating has a layered structure comprising at least two bilayers, each bilayer comprising a nanoplatelet layer and a polymer layer is described. A composite material comprising a plurality of coated fibres and a matrix is also described.

36 Claims, 17 Drawing Sheets

(51) Int. Cl.
*C03C 25/47* (2018.01)
*D06M 11/50* (2006.01)
*D06M 11/55* (2006.01)

(58) Field of Classification Search
USPC .......................................................... 523/202
See application file for complete search history.

(56) References Cited

U.S. PATENT DOCUMENTS

| | | |
|---|---|---|
| 2008/0280031 A1 | 11/2008 | Drzal et al. |
| 2012/0006686 A1 | 1/2012 | Furman et al. |
| 2014/0023513 A1 | 1/2014 | Johnson et al. |
| 2014/0134354 A1 | 5/2014 | Mazany |

FOREIGN PATENT DOCUMENTS

| | | |
|---|---|---|
| WO | WO 2008/021256 | 2/2008 |
| WO | WO 2008/060592 A2 | 5/2008 |
| WO | WO 2009/032062 A2 | 3/2009 |
| WO | WO 2009/085362 | 7/2009 |
| WO | WO 2011/103304 A2 | 8/2011 |
| WO | WO 2011/107662 | 9/2011 |
| WO | WO 2014/046708 A1 | 3/2014 |
| WO | WO 2015/148886 A1 | 10/2015 |
| WO | WO 2015/198657 A1 | 12/2015 |

OTHER PUBLICATIONS

Gao et al., "Materials become insensitive to flaws at nanoscale: Lessons from nature", PNAS, May 13, 2003, vol. 100, No. 10, pp. 5597-5600.

International Search Report and Written Opinion dated Mar. 21, 2018, in International Patent Application No. PCT/GB2017/053757, 13 pages.

Combined Search and Examination Report dated May 17, 2017, in UK Patent Application No. GB 1621494.2, 7 pages.

\* cited by examiner

COMPOSITE MATERIAL

TECHNICAL FIELD

The present invention generally relates to the field of composite materials.

BACKGROUND

Composite materials comprising structural fiber reinforced polymers are widely used because of their excellent mechanical properties, thermal properties, lightweight, low cost and corrosion resistance. Interfacial adhesion between fiber and matrix is essential to ensure efficient stress transfer. Different mechanisms for fiber/matrix interactions can occur in composite materials, namely, wetting, interdiffusion, electrostatic attraction, chemical bonding and mechanical bonding. Despite their many advantages, the use of composites is often limited by their tendency to fail catastrophically with little prior warning. Under load, the reinforcing fibers begin to fragment due to the stochastic distribution of fiber strengths and local load distribution. However, as clusters of broken fibers form, the high stress concentration in neighbouring fibers localizes the failure, which triggers catastrophic fracture of the whole composite. Weakening the interface between the fibers and the matrix results in an increased toughness through fiber delamination (crack deflection) and subsequent pull-out but significantly reduces the mechanical properties of the composites. Even though there are many different sources of toughening in composite materials, the main source of toughness arises from fiber pull-out.

There is therefore a need for improved fiber-reinforced composite materials, for example in which the fiber matrix interaction is controlled in new ways to maximise strength and toughness, and to enable progressive rather than catastrophic failure.

SUMMARY OF THE INVENTION

It has been determined that fibers may be provided with a nanostructured coating comprising alternating nanoplatelet and polymer layers, the nanoplatelet layers may have an organised structure and that such layers of nanoplatelets and softer polymer give a coating with improved properties. Composite materials comprising such coated fibers and a matrix, such as a polymeric matrix, provide for increased toughness and strength of composite materials. Thus, the invention provides fibers coated with a nanostructured coating as described herein.

In a first aspect, the invention provides a coated fiber comprising a fiber and a coating, wherein the coating comprises nanoplatelets and a polymer, wherein the coating has a layered structure comprising at least two bilayers, each bilayer comprising a nanoplatelet layer and a polymer layer. The bilayers are structured such that in the coating, the nanoplatelet layers and polymer layers are alternating. Accordingly, the coating comprises a plurality of alternating nanoplatelet and polymer layers.

The coating may comprise at least 10 bilayers. In some embodiments, the coating comprises at least 20 bilayers. The coating may comprise 10-100 bilayers, 10-80 bilayers or 10-60 bilayers. The number of bilayers may be from about 2 to about 100, from about 5 to about 75, from about 10 to about 50 bilayers, or from about 12 to about 25 bilayers.

The nanoplatelet layers may be nanoplatelet monolayers.

In a coated fiber of the invention, the fiber may be a glass fiber, carbon fiber, aramid fiber, polyoxazole fiber, vectran fiber, basalt fiber, alumina fiber, silicon carbide fiber, piezoelectric fiber, optical fiber or ceramic fiber, preferably a glass fiber or carbon fiber.

The polymer of the coating may be a polyelectrolyte. The polyelectrolyte may be a polyanionic or a polycationic polymer. For example, the polyelectrolyte may be a polyanionic polymer such as poly(styrene sulfonate), poly (acrylic acid), poly(methacrylic acid), poly(vinyl sulfonate), poly(phosphoric acid), poly(vinylphosphoric acid), poly (phosphonic acid), poly(vinylphosphonic acid), or a combination thereof. In some embodiments, the polyanionic polymer is poly(sodium 4-styrenesulfonate) (PSS).

The nanoplatelets may comprise inorganic material. This allows the nanoplatelets to be rigid and form a reinforcing layer. This inorganic material may be an inorganic ceramic. The inorganic material may comprise magnesium oxide (MgO), aluminium oxide ($Al_2O_3$), silicon dioxide ($SiO_2$), a silicate, an aluminosilicate, titanium dioxide ($TiO_2$), silicon carbide (SiC), carbon nitride ($C_3N_4$), silicon nitride ($Si_3N_4$), graphene, a metal carbide, an MXene, a layered double hydroxide or a combination thereof. Preferably, the nanoplatelets comprise a layered double hydroxide (LDH), preferably a layered double hydroxide of general formula $[Mg_2Al(OH)_6]CO_3 \cdot yH_2O$.

A coated fiber of the invention may further comprise a precursor layer, wherein said precursor layer is disposed between the fiber and the coating. The precursor layer comprises a polymer, preferably a polyelectrolyte as described herein. Preferably, the identity of the polymer of the precursor layer differs from that of the polymer of the coating. Preferably, the precursor layer comprises a polycationic polymer. Preferably, the precursor layer comprises poly(diallyldimethylammonium chloride) (PDDA).

The nanoplatelets may have an average width less than or equal to $W_{p,max}$, wherein $W_{p,max}$ is determined according to the formula:

$$w_{p,max} = 2r.\arccos\left(\frac{r}{r + \Delta d_{polymer}}\right) \quad (1)$$

where $W_{p,max}$ is the maximum platelet width, $\Delta d_{polymer}$, the fluctuation of the polymer layer thickness and may be half the thickness of a polymer layer, and r is the fiber diameter in nanometres. The fiber diameter may preferably be in the range of 5-20 μm, 5-15 μm or 5-10 μm.

In some embodiments, $W_{p,max}$ is determined according to the formula:

$$w_{p,max} = 2r.\arccos\left(\frac{r}{r + 0.75 \text{ nm}}\right)$$

where $W_{p,max}$ is the maximum platelet width and r is the fiber diameter in nanometres.

The nanoplatelets of the present invention may have an aspect ratio of at least about 5, at least about 6, at least about 7, at least about 8, at least about 9. The aspect ratio may be up to a maximum of about 45, about 40, about 35, about 30, about 25, about 20, about 15, about 14, 13, about 12 or about 11. The aspect ratio may be from about 7 to about 12, preferably about 8 to about 11, for example about 10.

The aspect ratio may preferably be as large as possible whilst still lower than the critical value, $s_c$, as described below, $$s_c = \frac{\sigma_p}{\tau_y} \quad (2)$$

where $\sigma_p$ and $\tau_y$ are the platelet tensile stress and interface yield shear strength, respectively. For a typical platelet, a suitable critical aspect ratio may be around 10, implying an optimum platelet width of at least 100-200 nm.

The nanoplatelets described herein may have an average (arithmetic mean) largest dimension (lateral width) of from about 100 nm to about 500 nm and an average thickness of from about 10 nm to about 30 nm.

The nanoplatelets may have a narrow size distribution in their lateral width and/or thickness. By narrow, it is meant that the standard deviation of the size of the nanoplatelets is less than 40%. The nanoplatelets may have a lateral width size distribution which has a standard deviation of less than 40%. Preferably, the nanoplatelets may have a lateral width size distribution which has a standard deviation of less than 38%, less than 36%, less than 35%, less than 34%, less than 32%, less than 30%. The nanoplatelets may have a thickness size distribution which has a standard deviation of less than 20%. Preferably, the nanoplatelets may have a thickness size distribution which has a standard deviation of less than 18%, less than 16%, less than 15%.

In some embodiments, the nanoplatelets may have a thickness of about 10 nm to about 50 nm, about 15 nm to about 40 nm, or about 20 nm to about 30 nm. Preferably, the nanoplatelets may have a thickness of about 20 nm.

The nanoplatelets may have lateral width of from about 20 nm to about 500 nm, from about 40 nm to about 400 nm, from about 50 nm to about 300 nm, from about 100 nm to about 200 nm, from about 100 nm to about 150 nm, from about 115 nm to about 145 nm. Preferably, the nanoplatelets may have an average lateral width of about 130 nm to about 145 nm.

The coated fiber may, for example, comprise a fiber with a diameter of 5-10 µm, nanoplatelets with an average width of no more than 200 nm. The nanoplatelets may, for example, have an aspect ratio of 7 to 12.

The thickness of the nanoplatelet layers may be at least about 5 times and up to about 20 times that of the polymer layers. The thickness of the nanoplatelet layer may be at least about 8 times and up to about 12 times, for example about 10 times, that of the polymer layer.

The volume ratio of nanoplatelet to polymer may be at least about 70:30, at least about 80:20, at least about 85:15, or at least about 90:10. The volume ratio of nanoplatelet to polymer may be up to about 98:2, up to about 96:4, up to about 95:5, or up to about 92:8. For example, the volume ratio may be about 70:30 to about 98:2, about 80:20 to about 95:5, about 85:15 to about 95:5, or about 88:12 to about 92:8. Preferably, the volume ratio is about 90:10.

The coating may comprise a volume ratio of nanoplatelets to polyelectrolyte of at least about 80:20, a nanoplatelet aspect ratio of at least about 8, and the lateral width of the nanoplatelets may have a lateral width size distribution with a standard deviation of less than about 10%. Preferably, the coating comprises a volume ratio of nanoplatelets to polyelectrolyte of 80:20 to about 95:5 (for example about 90:10), a nanoplatelet aspect ratio of 8 to 10 (for example about 10), and the nanoplatelets may have a size distribution of the width of the nanoplatelets with a standard deviation of less than about 5%.

In a second aspect, the invention provides a composite material comprising a plurality of coated fibers according to the invention and a matrix, for example wherein the matrix comprises an epoxy resin.

In a third aspect, the invention provides a method of preparing a coated fiber according to the first aspect of the invention, the method comprising the steps of:
(a) providing a fiber; and
(b) coating the fiber with a coating comprising nanoplatelets and a polymer, wherein the fiber is coated with at least two bilayers, each bilayer comprising a layer of nanoplatelets and a layer of polymer.

DISCLOSURE OF THE INVENTION

Figure 1:
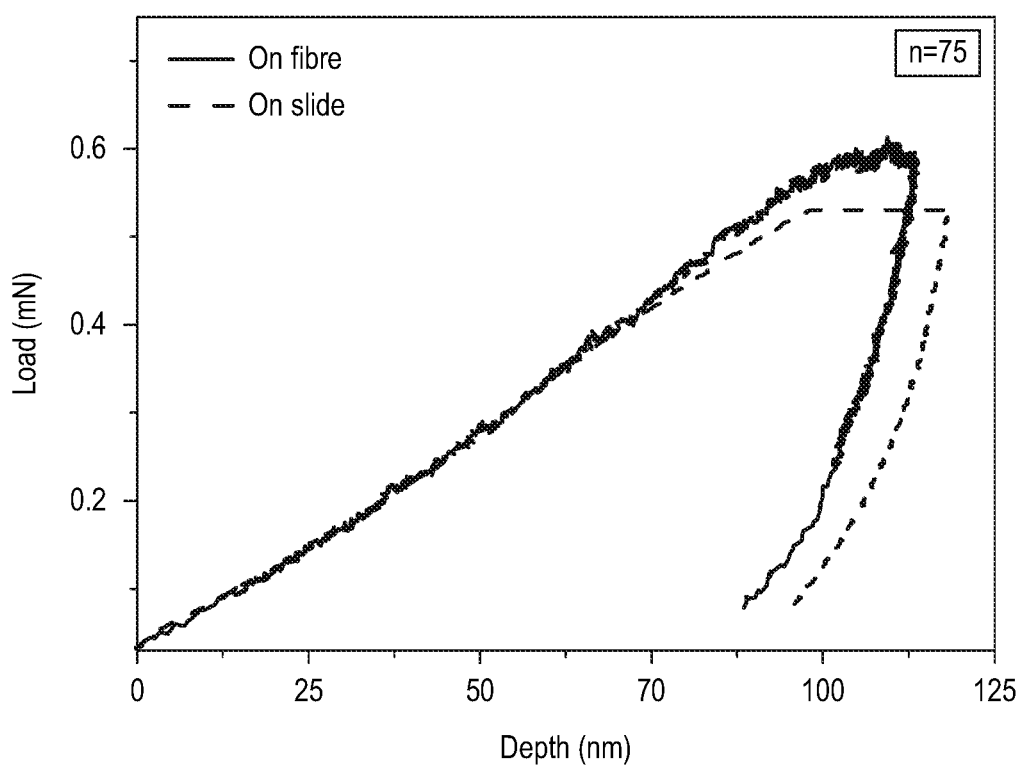
FIG. 1 shows nanoindentation load-displacement curves of a PDDA/(PSS/LDH)$_{75}$ coated glass fiber and a LDH/(PSS/LDH)$_{75}$ coated glass slide.

The present invention is based on the recognition that composite materials comprising coated fibers and a matrix, wherein the coated fibers comprise fibers and a coating comprising alternating layers of nanoplatelets and a polymer, provide for increased toughness and strength of the composite material.

A coated fiber according to the present invention comprises a fiber and a coating wherein the coating comprises nanoplatelets and a polymer, wherein the coating has a layered structure comprising at least two bilayers, each bilayer comprising a nanoplatelet layer and a polymer layer. The bilayers are structured such that in the coating, the nanoplatelet layers and polymer layers are alternating. It will be appreciated that the polymer layer within a bilayer may consist essentially of polymer and the nanoplatelet layer comprises nanoplatelets and may also comprise polymer interspersed between said nanoplatelets. The coating is also known herein as a nanostructured coating. The coating may consist essentially of nanoplatelets and a polymer.

The coating comprises a plurality of bilayers and consequently, a plurality of alternating nanoplatelet and polymer layers. A plurality of bilayers leads to improved mechanical properties of the coated fiber and composite material.

The nanoplatelets may have a surface charge. This may enable the nanoplatelets to assemble with a complementarily charged polymer in the coating. The nanoplatelets may have a positive surface charge. The nanoplatelets may have a negative surface charge.

The nanoplatelets may comprise inorganic material. This allows the nanoplatelets to be rigid and form a reinforcing layer. This inorganic material may be an inorganic ceramic. The inorganic material may comprise magnesium oxide (MgO), aluminium oxide ($Al_2O_3$), silicon dioxide ($SiO_2$), a silicate, an aluminosilicate, titanium dioxide ($TiO_2$), silicon carbide (SiC), carbon nitride ($C_3N_4$), silicon nitride ($Si_3N_4$), graphene, a metal carbide, an MXene, a layered double hydroxide or a combination thereof. Preferably, the nanoplatelets comprise a layered double hydroxide, preferably a layered double hydroxide of general formula [$Mg_2Al(OH)_6$]$CO_3$.y$H_2O$.

Layered double hydroxides (LDHs) are ionic solids characterized by a layered structure comprising layers of metal cations, hydroxide anions (OH$^-$) and layers of other anions and neutral molecules such as water. A LDH may comprise a generic layer structure represented by [AcANAcA]$_n$, wherein each c represents a metal cation layer, each A represents a hydroxide anion layer and N represents a layer of other anions and neutral molecules such as water. Preferably, a layered double hydroxide as referenced herein may be represented by the general formula [$M^{2+}_{1-x}M^{3+}_x(OH^-)_2$] ($A^{n-}_{x/n}$.y$H_2O$), wherein $M^{2+}$ represents a divalent metal cation, $M^{3+}$ represents a trivalent metal cation; $A^{n-}$ represents an n-valent anion, n is an integer not less than 1, x represents the proportion of trivalent metal to the total metal ion content (and may for example be a value of 0.1 to 0.4), and y denotes a variable amount of water, and therefore represents a value not less than 0. $M^{2+}$ may, for example be a Mg, Ca, Mn, Fe, Co, Ni, Cu, Pd, Ti or Zn divalent cation. $M^{3+}$ may, for example, be a Al, Mn, Fe, Ga, Rh, Ru, Cr, V, In, Y, Gd, Ni, or La trivalent cation. $A^{n-}$ may, for example, be $CO_3^{2-}$, halide, silicate, Cl$^-$, Br$^-$, $NO_3^-$, $SO_4^{2-}$, $S^{2-}$, [$Sb(OH)_6$]$^-$, $SeO_4^{2-}$, aromatic carboxylate, aliphatic carboxylate, or alkanesulfonate. Preferably, the LDH is of general formula [$Mg_2Al(OH)_6$]$CO_3$.y$H_2O$.

MXenes are inorganic materials comprising layers of metal carbide material, for example M'$_2$M''$C_2$ or M'$_2$M''$_2C_3$, with surface terminations of, for example hydroxide or oxide. M' and M'' represent two different transition metals, preferably group 4-6 transition metals.

A nanoplatelet as referred to herein is a platelet having at least one dimension of 100 nm or less. Nanoplatelets are anisotropic in geometry, being laterally wider than thick. The term "nanoplatelets" refers to a plurality of platelets, having an average (arithmetic mean) smallest dimension of 100 nm or less. Accordingly, nanoplatelets may have an average thickness of 100 nm or less. For example, the nanoplatelet described herein may have an average (arithmetic mean) largest dimension (lateral width) of from about 100 nm to about 500 nm and an average thickness of from about 10 nm to about 30 nm. Dimensions of nanoplatelets may be determined by transmission electron microscopy (TEM), preferably performed on a sample of 200 or more platelets. The nanoplatelets may be crystalline.

The polymer may be a polyelectrolyte. A polyelectrolyte is a polymer characterized by repeating units comprising ionisable or ionic groups. These ionisable or ionic groups may be capable of electrostatic interactions.

Suitable polyelectrolytes include polyanionic polymers. Such polyanionic polymers include poly(styrene sulfonate), poly(acrylic acid), poly(methacrylic acid), poly(vinyl sulfonate), poly(phosphoric acid), poly(vinylphosphoric acid), poly(phosphonic acid), polydimethylsiloxane and poly(vinylphosphonic acid). Preferably, the polyelectrolyte is poly(sodium 4-styrene sulfonate) (PSS).

Suitable polyelectrolytes include polycationic polymers. Such polycationic polymers include polydiallydimethyl ammonium, poly(ethyleneimine), poly(allylamine hydrochloride), polyvinyl amine, polyamidoamine, poly(vinylbenzyltriamethylamine), poly(dimethylaminoethyl methacrylate), and poly(methacryloylamino)propyltrimethylammonium chloride.

The polymer layer may, for example, have a thickness of about 1 nm to about 6 nm, about 1 nm to about 5 nm, about 1 nm to about 3 nm or about 1 nm to about 2 nm. Preferably, the polymer layer may have a thickness of about 2 nm. The thickness of the polymer layer may be tuned by varying molecular weight of the polymer used to form the coating.

The molecular weight (Mw) of a polymer is expressed as weight average molecular weights, except where otherwise specified. Any of the polymers mentioned above may, for example, have a Mw of 50,000-200,000.

The coated fiber may further comprise a precursor layer, wherein said precursor layer is disposed between the fiber and the coating. The precursor layer is preferably a polymer layer and may be formed from a polymer as described above for the polymer component of the coating. The identity of the polymer of the precursor layer may differ from that of the polymer of the coating. The addition of a precursor layer allows for improved adhesion of the coating to the bare fiber and thus for higher interfacial mechanical loading. Preferably, the precursor layer comprises a polycationic polymer. Preferably, the precursor layer comprises poly(diallyldimethylammonium chloride) (PDDA).

Preferably, the polymer of the coating, the nanoplatelets and the polymer of the precursor layer, when present, may all be charged. The fiber may be charged. The nanoplatelets may be oppositely charged to the polymer of the coating. For example, when the nanoplatelets are negatively charged, the polymer of the coating may be positively charged. When the nanoplatelets are positively charged, the polymer of the coating may be negatively charged. Preferably, a precursor layer may be used when when the fiber and the nanoplatelets are oppositely charged. For example, when the fiber is negatively charged, a positively charged precursor layer may be used, which would then be covered by a negatively charged polymer layer and positively charged nanoplatelet layer. For example, wherein the polymer of the coating and of the precursor layer are both polyelectrolytes, one may be a polycationic polymer and the other may be a polyanionic polymer. In case the fiber and the nanoplatelets have the same charge, the polymer of the coating is oppositely charged, and no precursor layer may be required.

In some embodiments, the layer adjacent to the fiber is either a precursor or a polymer layer of a bilayer.

The width (also referred to as lateral width) of a nanoplatelet is the largest dimension of the nanoplatelet. For example, for a circular nanoplatelet, the width would be equivalent to the diameter of the circle. For hexagonal nanoplatelets, the width would be equivalent to the largest diagonal. The average width (arithmetic mean) and width distribution of nanoplatelets may be measured using TEM. TEM images may be analysed, for example using ImageJ (software). The width of a sample of 200 or more nanoplatelets may be measured, with results expressed as arithmetic mean and standard deviation values.

The average thickness of nanoplatelets may also be determined by TEM, using edge-on TEM images of a nanoplatelets sample as indicated above to give an average thickness (arithmetic mean). Atomic force microscopy (AFM) and X-ray diffraction (XRD) techniques may also be used to measure thickness of nanoplatelets. For example, for LDH nanoplatelets of general formula $[Mg_2Al(OH)_6]CO_3 \cdot yH_2O$, the thickness of nanoplatelets was measured using TEM and also confirmed by XRD using the Scherrer equation:

$$L = \frac{0.89 \cdot \lambda}{\beta \cdot \cos\theta}$$

where L is thickness, $\lambda$ is the wavelength of the radiation (0.15418 nm), $\theta$ is the Bragg diffraction angle of the (003) crystallographic place and $\beta$ is the full width at half maximum of the (003) diffraction peak.

The nanoplatelets may have a narrow size distribution in their lateral width and/or thickness. By narrow, it is meant that the standard deviation of the size of the nanoplatelets is less than 40%. The nanoplatelets may have a lateral width size distribution which has a standard deviation of less than 40%, less than 38%, less than 36%, less than 35%. Preferably, the nanoplatelets may have a lateral width size distribution which has a standard deviation of less than 34%, less than 32%, less than 30%. The nanoplatelets may have a thickness size distribution which has a standard deviation of less than 20%, less than 18%, less than 16%. Preferably, the nanoplatelets may have a thickness size distribution which has a standard deviation of less than 15%. The lateral width and thickness size distribution of the nanoplatelets may be determined, for example, by transmission electron microscopy (TEM) and using image analysis software.

The coating should preferably be conformal to the surface of the fiber. Production of a conformal coating on a fiber optimises properties and may be achieved by ensuring appropriate sizing of nanoplatelets in relation to the fiber. In particular, the nanoplatelets preferably have an average width at or below a maximum platelet width, which may be determined on the basis of the fiber diameter.

Figure 12:
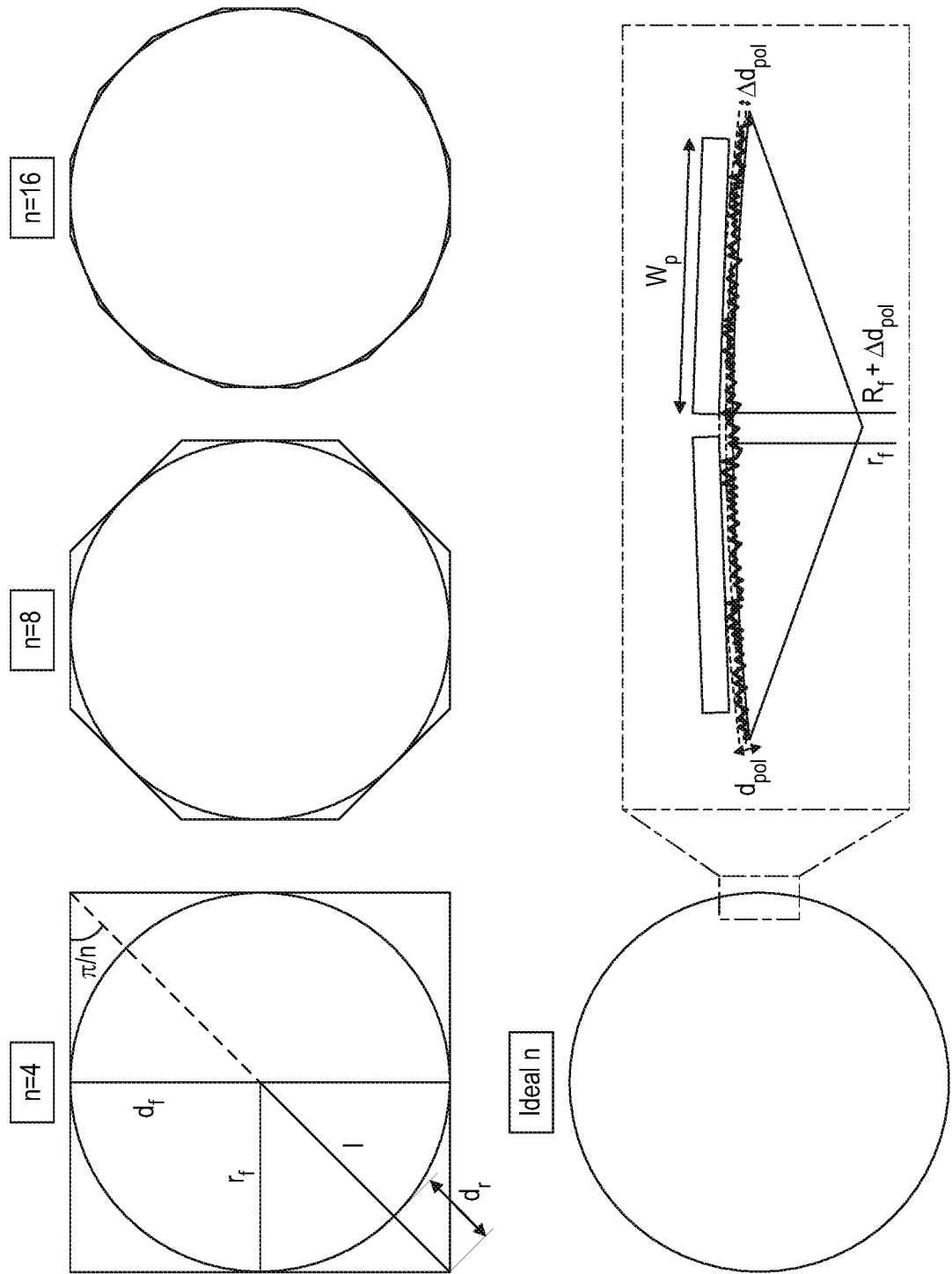
FIG. 12 shows an illustration of arrangement of platelets on the circumference of a fiber as a function of the number of platelets, deposited over a polymer layer.

Depending on the fiber diameter, a minimum number of platelets tangentially deposited around the circumference of the fiber can be estimated and subsequently related to a maximum platelet width. An analytical approach, based on the deviation of tangentially deposited platelets on a fiber as a function of the number of platelets in the circumference of the fiber, can be used to estimate the maximum platelet width (FIG. 12). The deviation of the platelets from the fiber surface can be expressed as followed.

$$d_r = l - r$$

where l and r are the deviated length and fiber radius, in nanometers, respectively. The deviated length can be expressed as a function of the number of platelets, n, as described below.

$$l = \frac{r}{\cos\left(\frac{\pi}{n}\right)}$$

For a large number of platelets, the perimeter of the fiber is estimated to the sum of the width of all the platelets, leading to the following expression, where $w_p$ corresponds to the platelet width.

$$w_p = \frac{2 \pi r}{n}$$

The maximum platelet width leading to conformal coating deposition on a polymer precursor layer can be associated with a platelet deviation of half the thickness of the polymer layer ($\Delta d_{polymer}$), similar to the fluctuation of the polymer layer thickness:

$$w_{p,max} = 2r \cdot \arccos\left(\frac{r}{r + \Delta d_{polymer}}\right) \quad (1)$$

where $w_{p,max}$ and $\Delta d_{polymer}$ are the maximum platelet width and the fluctuation of the polymer layer thickness, respectively ($d_r = \Delta d_{polymer}$).

Accordingly, preferably the nanoplatelets have an average width less than or equal to $W_p$, determined based on the fiber diameter as described above. For example, maximum platelet widths of 188 and 167 nm were calculated fibers with diameters of 9 and 7 μm, respectively. In such embodiments, the fiber may preferably be of diameter in the range of 5-20 μm, 5-15 μm or 5-10 μm.

It is also useful to consider a minimum platelet size. As an example, a polymer layer thickness in the range of 1 to 2 nm, and an inorganic:organic volume ratio in each bilayer of the structure, of around 90:10, implies a platelet thickness of around 10-20 nm (or more).

In more detail, if, for example, it is assumed that the inorganic:organic volume ratio in each bilayer of the structure is around 90:10 (90 vol. % of platelets), implying a polymer layer thickness 9 times thinner than the platelet thickness (the smaller amount of polymer present between two adjacent platelets is neglected compared to that contained between two layers), it is possible to express the polymer layer ($d_{polymer}$) and half polymer layer (maximum acceptable deviation, $\Delta d_{polymer}$) thickness as below:

$$d_{polymer} = \frac{w_p}{9 \cdot s}$$

$$\Delta d_{polymer} = \frac{w_p}{18 \cdot s}$$

Using these values for $\Delta d_{polymer}$, an expression for the maximum platelet width can be obtained:

$$w_{p,max} = 2r \cdot \arccos\left(\frac{r}{r + \frac{w_{p,max}}{18 \cdot s}}\right) \quad (3)$$

The minimum platelet width, $w_{p,min}$, may be defined by the minimum polymer layer thickness, $d_{polymer,min}$, about 1.5 nm (molecular dimensions) as follows:

$$w_{p,min} = 9 \cdot s \cdot d_{polymer,min} \quad (4)$$

On the other hand, for example, the maximum platelet width, if using a molecularly limited self-assembly process (such as Layer-by-Layer assembly of polyelectrolyte) with a 1.5 nm-thick polymer layer, can be determined as below:

$$w_{p,max} = 2r \cdot \arccos\left(\frac{r}{r + 0.75 \text{ nm}}\right) \quad (5)$$

The aspect ratio as used herein is the ratio of the lateral width of the nanoplatelets over thickness of the nanoplatelets. The nanoplatelets of the present invention may have an aspect ratio of at least about 5, at least about 6, at least about 7, at least about 8, at least about 9. The aspect ratio may be up to a maximum of about 45, about 40, about 35, about 30, about 25, about 20, about 15, about 14, about 13, about 12 or 11. The aspect ratio may be from about 7 to about 12, preferably about 8 to about 11, for example about 10.

The aspect ratio of the platelet may be defined by the critical aspect ratio. This enables pull-out rather than fracture. The aspect ratio should preferably be as large as possible whilst still lower than the critical value, $s_c$, as described below, $$s_c = \frac{\sigma_p}{\tau_y} \quad (2)$$

where $\sigma_p$ and $\tau_y$ are the platelet tensile strength and interfacial yield shear strength, respectively. The tensile strength of nanoplatelets may potentially be measured using AFM, in situ TEM deformation experiments, and/or Raman staining experiments. Alternatively, they may be estimated based on idealised macroscopic properties or calculations.

The aspect ratio may be assessed by observing the pull-out strength in a fracture surface of a coated fiber containing nanoplatelets embedded in resin. The maximum observed length is half the critical length. The critical aspect ratio may then be determined. For a typical platelet, a suitable critical aspect ratio may be around 10, implying an optimum platelet width of at least 100-200 nm.

The equations and arguments above provide a rational basis to optimise the geometry of the structure for a given fiber and nanoplatelet system.

In some embodiments, the nanoplatelets may have an average thickness (arithmetic mean) of about 10 nm to about 50 nm, about 15 nm to about 40 nm, or about 20 nm to about 30 nm. Preferably, the nanoplatelets may have a thickness of about 20 nm.

The nanoplatelets may have an average lateral width (arithmetic mean) of from about 20 nm to about 500 nm, from about 40 nm to about 400 nm, from about 50 nm to about 300 nm, from about 100 nm to about 150 nm, from about 115 nm to about 145 nm lateral width. Preferably, the nanoplatelets may have an average lateral width of about 130 nm to about 145 nm.

The coated fiber may, for example, comprise a fiber with a diameter of 5-10 µm, nanoplatelets with an average width (arithmetic mean) of no more than 200 nm. The nanoplatelets may, for example, have an aspect ratio of 7 to 12.

It is preferable for the polymer layers of the coating to be significantly thinner than the nanoplatelet layers. The thickness of the nanoplatelet layers may be at least about 5 times and up to about 20 times that of the polymer layers. The thickness of the nanoplatelet layer may be at least about 8 times and up to about 12 times, for example about 10 times, that of the polymer layer. The relative thickness of the nanoplatelet to polymer layers may also be referred to as the volume ratio of nanoplatelet to polymer. This volume ratio may, for example, be calculated based on the overall thickness of the coating, the number of bilayers and the thickness of nanoplatelets. The volume ratio may also be obtained by determining the weight fraction by thermogravimetric analysis (TGA), and then converted to a volume ratio by using the constituent density. The volume ratio of nanoplatelet to polymer may be at least about 70:30, at least about 80:20, at least about 85:15, or at least about 90:10. The volume ratio of nanoplatelet to polymer may be up to about 98:2, up to about 96:4, up to about 95:5, or up to about 92:8. For example, the volume ratio may be about 70:30 to about 98:2, about 80:20 to about 95:5, about 85:15 to about 95:5, or about 88:12 to about 92:8. Preferably, the volume ratio is about 90:10. This ratio may allow for improved strain hardening of the composite material.

The coating may comprise a volume ratio of nanoplatelets to polyelectrolyte of at least about 80:20, a nanoplatelet aspect ratio of at least about 8, and the lateral width of the nanoplatelets may have a lateral width size distribution with a standard deviation of less than about 40%. Preferably, the coating comprises a volume ratio of nanoplatelets to polyelectrolyte of 80:20 to about 95:5 (for example about 90:10), a nanoplatelet aspect ratio of 8 to 10 (for example about 10), and the nanoplatelets may have a size distribution of the width of the nanoplatelets with a standard deviation of less than about 35%.

The nanoplatelets are anisotropic in structure, by virtue of a lateral width which is greater than thickness. The nanoplatelets may be regular in shape. For example, the nanoplatelets may be hexagonal.

The nanoplatelets may form a monolayer, such that the nanoplatelet layer of each bilayer comprises a single layer of nanoplatelets. Preferably, the monolayer may be a monolayer where the nanoplatelets do not overlap. The nanoplatelets may form a packed array. Preferably, the monolayer may be a tessellated monolayer.

The nanoplatelets may self-assemble to form a monolayer. Self-assembly may be due to complementary interactions between the nanoplatelets and the polymer. For example, self-assembly may be due to electrostatic interactions between oppositely charged polymer and nanoplatelets. Other functionalities such as hydrogen bond donor/acceptor, metal ions/ligands, and covalent binding moieties may be the driving force for self-assembly. Preferably, the interactions are electrostatic interactions.

The nanoplatelets may align to tessellate. The degree of alignment of the nanoplatelets may be quantified by using three-dimensional X-ray diffraction (XRD) rocking curves for the crystallographic plane parallel to the nanoplatelet surface.

A coating as described herein comprises nanoplatelets and a polymer. The polymer preferably has an elastic modulus lower than the elastic modulus of the nanoplatelets by an order of magnitude or more. For example, the polymer has an elastic modulus lower than the elastic modulus of the nanoplatelets by at least 50%. Preferably, the elastic modulus of the polymer is an order of magnitude lower than that of the nanoplatelets.

A fiber as referred to herein is preferably a cylindrical fiber. The fiber may be glass fiber, carbon fiber, aramid fiber, polyoxazole fiber, Vectran fiber, basalt fiber, alumina fiber, silicon carbide fiber, piezoelectric fiber, optical fiber or ceramic fiber. Preferably, the fiber is glass or carbon fiber. The glass fiber may have any diameter, for example a diameter of from about 5 μm to about 100 μm, from about 5 μm to about 50 μm, or from about 5 μm to about 30 μm.

A glass fiber may, for example, have a diameter of from about 5 μm to about 30 μm, from about 6 μm to about 25 μm, from about 7 μm to about 22 μm, from about 8 μm to about 21 μm, from about 9 μm to about 20 μm, from about 10 μm to about 19 μm, from about 11 μm to about 18 μm, from about 12 μm to about 17 μm, from about 13 μm to about 15 μm. The glass fiber may have a diameter of about 5 μm, about 6 μm, about 7 μm, about 8 μm, about 9 μm, about 10 μm, about 11 μm, about 12 μm, about 13 μm, about 14 μm, about 15 μm, about 17 μm, or about 20 μm.

A carbon fiber may, for example, have a diameter of from about 5 μm to about 18 μm, from about 6 μm to about 15 μm, from about 7 μm to about 13 μm, from about 8 μm to about 12 μm, from about 9 μm to about 11 μm. The carbon fiber may have a diameter of about 5 μm, about 6 μm, about 7 μm, about 8 μm, about 9 μm, about 10 μm, about 11 μm, about 12 μm, about 13 μm.

In another embodiment, the invention provides a composite material comprising a plurality of coated fibers as defined in any of the above embodiments.

In another embodiment, the invention provides a composite material comprising a coated fiber as defined in any of the above embodiments and a matrix. The matrix may comprise a resin. The resin may comprise a thermoplastic or thermoset resin. The resin may comprise a polyester resin, a vinyl ester resin, an epoxy resin, a phenolic resin, a cyanate ester resin, a polybenzoxazine resin, bis-maleimide resin, polyimide resin, polyurethane resin, silicone resin, acrylic resin, phenol melamine formaldehyde resin, phenol urea formaldehyde resin, urea melamine resin, melamine resin, formaldehyde resin, melamine formaldehyde resin, urea formaldehyde resin, phenol formaldehyde resin, or mixtures thereof. Preferably, the resin comprises an epoxy resin.

In another aspect, the invention provides a method of preparing a coated fiber according to the first aspect of the invention comprising the steps of:
(a) providing a fiber; and
(b) coating the fiber with a coating comprising nanoplatelets and a polymer as described in relation to any embodiment of the first aspect of the invention.

The fiber may be coated in layers, i.e. the coating step may comprise coating the fiber with at least one layer comprising a polyelectrolyte and at least one layer comprising nanoplatelets.

The fiber may be coated with at least two bilayers comprising a layer of nanoplatelets and a layer of polymer.

Preferably, the fiber may be coated with a plurality of alternating polymer and nanoplatelet layers. The fiber may be coated with at least 10 bilayers.

The layers disposed on the fiber may comprise at least two bilayers deposited by what is commonly referred to as a "layer-by-layer" assembly process (LbL). This process may be used to assemble coatings of oppositely charged polymers and particles electrostatically, but other functionalities such as hydrogen bond donor/acceptor, metal ions/ligands, and covalent binding moieties may be the driving force for coating assembly.

The deposition process involves exposing the fiber having a surface charge to a series of liquid solutions or baths. This can be accomplished by immersion of the fiber into the liquid baths (also referred to as dip coating). Exposure to a first liquid solution, which has charge opposite to that of the fiber, results in charged species near the fiber surface adsorbing quickly, establishing a concentration gradient. Further adsorption occurs until a sufficient layer has developed to mask the underlying charge and reverse the net charge of the fiber surface. The fiber is then removed from the first liquid solution, and is then exposed to a series of water rinse baths to remove any physically entangled or loosely bound charged compounds or particles. Following the rinse liquid solutions, the fiber is then exposed to a second liquid solution, which has charge opposite to that first liquid solution. Once again adsorption occurs, since the surface charge of the fiber is opposite that of the second liquid solution. Continued exposure to the second liquid solution then results in a reversal of the surface charge of the fiber. A subsequent rinsing can be performed to complete the cycle of the deposition of a bilayer. This sequence of steps builds up one layer pair, also referred to as a "bilayer" of deposition and can be repeated as desired to add further layer pairs to the fiber.

Preferably, the coating of the fiber is done by layer-by-layer assembly.

The method may comprise performing layer-by-layer assembly on a plurality of fibers. This is advantageous as it allows the uniform coating of a large number of fibers in parallel. This feature is important for practical application of the the LbL technique. It is surprising that it is possible to coat a plurality of fibers in parallel and/or continuously using the layer-by-layer methodology described above. Preferably, the method of this aspect of the invention may be carried out as a continuous process. The method may be performed using a series of baths. The method may advantageously be performed continuously on a fiber line.

The first liquid solution may comprise a solution comprising a polyelectrolyte or a solution comprising nanoplatelets.

The second liquid solution may comprise a solution comprising polyelectrolyte or a solution comprising nanoplatelets. Preferably, the second liquid solution comprises a polyelectrolyte or nanoplatelet which is complementarily charged to the polyelectrolyte or nanoplatelet of the first liquid solution.

The solutions may be stirred during deposition. Preferably the liquid solution comprising the nanoplatelets is stirred. This allows the formation of a nanoplatelet monolayer without the formation of nanoplatelet overlap and also allows the removal of loosely attached nanoplatelets. This also allows for full monolayer coverage on fibers.

Alternate layers of polyelectrolyte and nanoplatelets may be deposited onto the fiber.

The thickness of a bilayer may be from about 10 nm to about 50 nm, about 12 nm to about 40 nm, about 15 nm to about 30 nm. The thickness of a bilayer may be at least about 10 nm, at least about 12 nm, at least about 15 nm, or at least about 16 nm. Preferably, the thickness of the bilayer may be about 16 nm.

The thickness of a plurality of bilayers may be from about 150 nm to about 1.5 μm, from about 170 nm to about 1.3 μm, from about 200 nm to about 1.2 μm.

The number of bilayers may be from about 2 to about 100 bilayers, from about 5 to about 75 bilayers, from about 10 to about 50 bilayers, from about 12 to about 25 bilayers.

The method may further comprise pre-treating the fiber prior to coating the fiber. The pre-treatment may improve the bonding of the nanostructured interphase to the bare fiber. Pre-treatment may comprise desizing the fiber.

Pre-treatment of the fiber may comprise treatment with an oxidizing agent. For example, pre-treatment of a carbon fiber may comprise treating it with oxygen plasma, with an oxidising acid, or another oxidant, for example a $KMnO_4$ solution. Pre-treatment of a glass fiber may include treating it with a peroxide solution, for example hydrogen peroxide.

Fibers may be pre-treated with a covalent functionalising agent, for example a silane coupling agents, to present the desired surface charge or motif. This allows for self-assembly of the nanoplatelet layer.

The fiber may be desized in a solution comprising sulphuric acid and hydrogen peroxide, preferably 2:1 sulphuric acid and hydrogen peroxide.

The method may further comprise coating the fiber with a polymer to form a precursor layer as described in respect of the first aspect of the invention, prior to coating step (b).

In another aspect, the invention provides a method of preparing a composite material, comprising embedding a plurality of coated fibers as described above within a matrix.

The coated fibers and composite material comprising the coated fibers may be used in composite materials, for example materials used for the construction of aircraft, wind turbine blades, sporting goods and civil engineering infrastructure.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consisting essentially of", "consists" and "consists of". In any aspects or embodiments of the invention discussed above, "comprising" may also refer to "consisting essentially of".

Preferred or optional features of each aspect of the invention are as for each of the other aspects mutatis mutandis.

EXAMPLES

Methods

Materials: Poly (sodium 4-styrene sulfonate) solution (PSS, Mw=70,000, 30 wt. % in $H_2O$), poly (diallyldimethylammonium chloride) solution (PDDA, Mw=100,000-200,000 low molecular weight, 20 wt. % in $H_2O$), $Mg(NO_3)_2 \cdot 6H_2O$, $Al(NO_3)_3 \cdot 9H_2O$, NaOH and $Na_2CO_3$ were purchased from Sigma-Aldrich. Deionized water (15 $M\Omega \cdot cm^{-1}$), sulphuric acid (95%) and hydrogen peroxide (30 wt. % in $H_2O$) were purchased from VWR. S2 sized glass fiber yarns (about 4.3 k) were kindly provided from AGY, Inc. Two component epoxy system (Loctite, double bubble 2-part epoxy, IDH-1303596) was purchased from RS components.

Synthesis of $Mg_2$—Al—$CO_3$-LDH: A 10 ml metal salt solution containing 2 mM of $Mg(NO_3)_2 \cdot 6H_2O$ and 1 mM $Al(NO_3)_3 \cdot 9H_2O$ as well as a 40 ml basic solution containing 6 mM NaOH and 0.6 mM $Na_2CO_3$ were prepared separately. The metal salt solution was added to the basic solution in less than 5 s, under vigorous stirring, followed by further stirring (750 rpm) at room temperature for 20 min. The mixture was then centrifuged at 15,000 rpm for 15 min to retrieve the LDH slurry. Subsequently, the slurry was washed twice by re-dispersion in deionized water followed by bath sonication (75 W) for 5 min and finally by centrifugation at 15,000 rpm for 15 min. After washing, the slurry was dispersed in 25 ml deionized water (0.4 wt %) via bath sonication and placed in an autoclave for hydrothermal treatment at 100° C. for 4 h (LDH-1) or 72 h (LDH-2). The time and temperature of the hydrothermal treatment were selected to synthesize nanoplatelets with varying dimensions, as set out in Table 1. The LDH solution was used within the first month after the synthesis to avoid possible re-aggregation; the quality of the dispersion remained stable over this timeframe.

| Synthesis conditions | Temp./° C. | Time/h | Conc/wt. % | ξ-pot pH 10/mV | Aspect ratio | Thickness/nm | Width/nm (±S.D) |
|---|---|---|---|---|---|---|---|
| LDH-1 | 100 | 4 | | | ~6 | ~8.6 | 49 ± 17 |
| LDH-2 | 100 | 72 | 0.4 | >+30 | ~10 | ~13.6 | 131 ± 44 |
| LDH-3 | 125 | 72 | | | ~8 | ~15.8 | 130 ± 117 |

| $(LDH/PSS)_n$ | LDH/wt. % | Platelet misalignment/° | LDH dep. Rate/abs · $n^{-1}$ | PSS dep. Rate/abs · $n^{-1}$ |
|---|---|---|---|---|
| LDH-1 | 57.3 | ±20 | 4.84 · $10^{-4}$ | 3.49 · $10^{-2}$ |
| LDH-2 | 88.4 | ±8 | 1.21 · $10^{-3}$ | 2.79 · $10^{-2}$ |
| LDH-3 | 83.3 | ±17 | 1.91 · $10^{-3}$ | 3.67 · $10^{-2}$ |

Solutions: After hydrothermal treatment, 25 ml LDH dispersion in water (0.4 wt. %) was further diluted with 20 ml of deionized water to obtain a LDH dispersion with a concentration of 0.3 wt. % at pH 10 (as synthesized). 3.35 ml of PSS was added to 1 L of deionized water to form a polyelectrolyte (PE) aqueous solution with a concentration of 0.1 wt. %. Similarly, 5 ml of PDDA was added to 1 L of deionized water to form a aqueous PE solution with a concentration of 0.1 wt. %. The pH of the PSS and PDDA solutions were then adjusted to 10 by the addition of 0.1 M NaOH.

Glass fiber tow preparation: Prior to LbL coating, the S2 glass fibers were desized in piranha solution (a 2:1 mixture of sulphuric acid and (30 wt. %) hydrogen peroxide). Tows of glass fibers were immersed in the piranha solution for about 1 h, heated to 90° C. and subsequently rinsed in deionized water multiple times. After treatment, the fibers were stored in a sealed jar filled with deionized water for a maximum of two weeks.

Layer-by-Layer assembly of $(LDH/PSS)_n$: In order to form a first monolayer of LDH nanoplatelets or PDDA on glass fibers, a bundle of negatively charged fibers (few hundreds) was dipped into the dispersion containing 0.3 wt. % positively charged LDH or in 0.1 wt. % PDDA solution at pH 10 for 10 min The bundle of fibers was subsequently rinsed by immersion in water at pH 10 for 2 min, by two dips of 30 s in two different water tubes. The rinsing step was carried out to remove excess particles weakly associated to the surface/meniscus after each deposition. To form (LDH/PSS) bilayers and multilayers, the charged glass fibers were alternately dipped into the LDH (0.3 wt. %) dispersion and PSS solution (0.1 wt. %) for 10 min each, interspersed by 2 min-rinsing steps in water after each deposition. The pH was kept constant at 10 throughout the entire process. Moderate stirring (300 rpm) of all solutions was used to allow for removal of the excess of particles and to ensure a full coverage of all fibers. Coating deposition was carried out using a home-made automatic dipping robot with dipping and removing rates fixed of about 0.4 cm s$^{-1}$. After deposition of the last layer, the coated fibers were rinsed and allowed to dry at room temperature overnight prior to characterization.

Oxygen plasma treatment of carbon fiber: Unsized carbon fibers were surface modified using a low pressure plasma (Plasma System Pico, 90179, Diener Electronic, Germany) treated under a flow of oxygen (50 sccm). Plasma oxidation of carbon fibers led to the formation of oxygen-containing groups on the surface of the fibers as well as in increase in surface roughness. Carboxyl and hydroxyl groups formed on the surface of the carbon fibers. Further modification of the surface of carbon fibers after plasma treatment was carried out by dipping the treated carbon fibers into a 0.1M $KMnO_4$ solution overnight followed by intense rinsing in water in order to convert the hydroxyl groups present on the surface of the modified carbon fibers into carboxyl groups, which are more likely to deprotonate. The deprotonation of the oxygen-containing group depends strongly depends on the pH of the solution in which the fibers are dipped. Negative charges are expected to arise at high pH, which can be evidence by using streaming zeta potential measurements.

Instrumental analysis: Imaging of the monolayer and multilayer coatings deposited on glass fibers was performed on a scanning electron microscope (SEM, LEO Gemini 1525 FEGSEM). Due to the non-conductive nature of the coating, a thin layer of gold (5 to 10 nm) was sputter coated on top of each sample prior to imaging. SEM was used to image the top surfaces and cross-sections of the coatings, operating at 5 keV.

Mechanical characterization of nanostructured interphase: The mechanical properties of the PDDA/(PSS/LDH)$_{75}$ coatings deposited on glass fibers were investigated using an nanoindenter (Alemnis) in-situ in an SEM (Auriga, Carl Zeiss), equipped with a Berkovich tip in load control. The interfacial properties between a bare glass and fibers coated with PDDA/(PSS/LDH)$_n$ and LDH/(PSS/LDH)$_n$ and epoxy resin were determined by single fiber pull-out testing and single fiber fragmentation tests. The single fiber pull-out test is based on the extraction of a partially embedded fiber from a matrix (Loctite, double bubble—epoxy system) by applying a force to the fiber perpendicular to the matrix surface. The fiber was embedded using a home-made embedding apparatus. The pull-out of the fiber was carried out using a piezo-motor fixed on a stiff frame. The free end of the fiber was glued to the clamping frame. The fiber was pulled-out at a speed of about 1 μm s$^{-1}$ while recording the load applied to the interface by a load cell until full extraction of the fiber on a home-made equipment. The maximum load required to initiate the delamination of the fiber is related to the interfacial shear strength (IFSS) of the interface as it can easily be converted into a stress, $$IFSS = \frac{Fmax}{Ae}$$

where, $F_{max}$ is the maximum load initiating the delamination and $A_e$, the embedded area of the fiber in the matrix. The IFSS was determined from the linear data fitting of $F_{max}$ as a function of $A_e$. In order to obtain a statistically significant value of the IFSS, at least 15 tests were carried out. The fiber pull-out toughness was determined by dividing the entire area under the load-displacement curve by the embedded area of the fiber. Debonding and extraction toughness were then extracted from the area under the corresponding region of the load-displacement curve.

Single fiber fragmentation tests were prepared by casting an epoxy film onto a glass slide on which 5 fibers were taped aligned about 200 to 300 μm above the surface by using a double-sided sticky tape. 5 ml of a 30 wt. % epoxy solution (Loctite, double bubble 2-part epoxy, IDH-1303596) in acetone was cast twice on the slide in order to obtain a 500 μm-thick film. After evaporation of the acetone, the film was gently peeled of the substrate using a scalpel and tweezers and subsequently punched into a dog-bone shape by using a punch press (Zwick, D-7900, Ulm, Germany) equipped with dog-bone die. The specimens were 40 mm-long and 7 mm-wide with a gauge length of 15 mm and 2.5 mm wide with a progressive increase in the specimen width between end-tab and gauge length from 2.5 to 7 mm along a length of 2.5 mm. The specimen was mounted on a small tensile tester (Linkam Scientific Instruments, TST350) equipped with a 200 N load cell. Initiation and saturation of fiber fragmentation up to a strain of 25% was tracked using camera mounted on an optical microscope. Stress concentration transferred to the matrix resin in the vicinity of a fiber fragment at various strain.

Glass Fibers

Glass fibers were desized in piranha solution, which in addition to removing the sizing also hydroxylates their surface. The treated fibers were hydrophilic, facilitating their spreading when dipped into aqueous LbL solutions but also negatively charged due to the presence of hydroxyl groups. The PSS solution, LDH suspension and water rinsing containers were stirred to ensure full monolayer coverage of each fiber in the entire bundle and complete removal of excess particles after each dipping step. Therefore, the deposition of the first monolayer of positively charged LDH platelets onto the negatively charged glass fiber surface was successful, without any apparent platelet overlapping or bald spots. To improve coating adhesion on the bare fiber, a PDDA precursor layer was deposited prior to $(PSS/LDH)_n$ coating deposition.

The coating thickness as a function of the number of (PSS/LDH) bilayer deposition as well as the mechanical properties of the coating deposited on the fibers were characterized-Indeed, repeated deposition of LDH and PSS monolayers leads to a linear increase in coating thickness. The mechanical properties of the coating, such as elastic modulus, hardness and plasticity strongly relate to the alignment of the platelets and proportion of inorganic phase in the nanostructure, which can be quantified by SEM in-situ nanoindentation.

The repetition of the deposition of (PSS/LDH)n onto fiber bundles led to the deposition of coatings with increasing thickness. All fibers were successfully coated with a homogeneous coating all around the surface as confirmed by SEM investigations of fiber cross-sections. SEM images of coating cross-sections revealed a linear increase of the coating thickness with increasing number of (PSS/LDH)n bilayers deposited, indicating a reproducible deposition of PSS and LDH monolayers onto the fibers. The coating thickness was measured from about 200 nm to about 1.2 µm, as the number of bilayers increased from 12 to 75, respectively. Deposition rates for coatings were obtained of about 16 nm per bilayer.

In order to assess the morphology of the LbL coating deposited around all glass fibers contained in fiber bundles, namely the inorganic phase proportion as well as the degree of alignment of the nanoplatelets, SEM in-situ nanoindentation was carried out on fibers coated with a thick PDDA/$(PSS/LDH)_{75}$ coating. A maximum depth of about 110 nm was reached, which is less than 10% of the coating thickness, avoiding any substrate effect. According to the tip dimensions and the coated fiber diameter, an indent about 240 nm wide was created on the surface of the coated fiber along a curvature of about 3.8°. Therefore, the coating can be considered to be flat at the scale of the measurement. The elastic modulus and hardness determined using the Oliver and Pharr method, were about 65.0±8.2 GPa and 2.3±0.7 GPa, respectively, which confirmed the successful deposition of the nanostructure coating onto cylindrical fibers. Indeed, the elastic modulus and hardness of the coating deposited on flat substrate were measured to be 65.8±3.2 GPa and 2.3±0.2 GPa. In addition, the plastic index of the coating deposited on glass fibers was measured and found to be similar to that of planar coating. This confirms the successful transfer of the anisotropic nanostructure on curved fibers.

The influence of the coated interphase on the adhesion properties of glass fiber/epoxy model composites was determined. Single fiber pull-out and fragmentation tests are particularly suitable as they allow for full characterization of the interphase in shear, namely interfacial shear strength and fiber slippage along with stress redistribution near a fiber break using the birefringence properties of an epoxy matrix observed via cross-polarized light. In addition to 130 nm wide LDH platelets, coating containing smaller platelets with a width of about 50 nm were also studied as a composite interphase. The incorporation of small LDH platelets into the coating leads to a higher proportion of the organic phase and, therefore, no strain hardening in shear. The investigation of the response of both potential composite interphases under shear, with small and optimized platelet dimensions, enables relating the strain hardening of the coating to the behaviour of the fiber when slipping.

Glass fibers with a nanostructured coating were embedded in an epoxy resin in order to investigate the properties of the nanostructured interphase in shear. In order to investigate the behaviour of the nanostructured interphase in shear, pull-out tests of single fibers partially embedded in epoxy were carried out. A room temperature curing epoxy resin was selected to avoid any dehydration of the nanostructure coating. The strength of the interphase in shear as well as the effect of the strain hardening behaviour of the coating on fiber debonding and slippage was studied. These pull-out tests can be divided in three consecutive steps (FIG. 2.A): i) the load applied to the fiber increases linearly due to elastic deformation of the interface followed by eventual inelastic deformation of the interface in shear (progressive debonding). ii) The interface reaches its maximum load barring capacity leading to full interface delamination. The load drops until the fiber is fully debonded and pulled-out from the matrix starts and iii), in the final step the fiber is pulled-out from the matrix. The pull-out is associated with fiber pull-out friction against the matrix, occurring until complete removal of the fiber from the matrix.

Figure 2A:
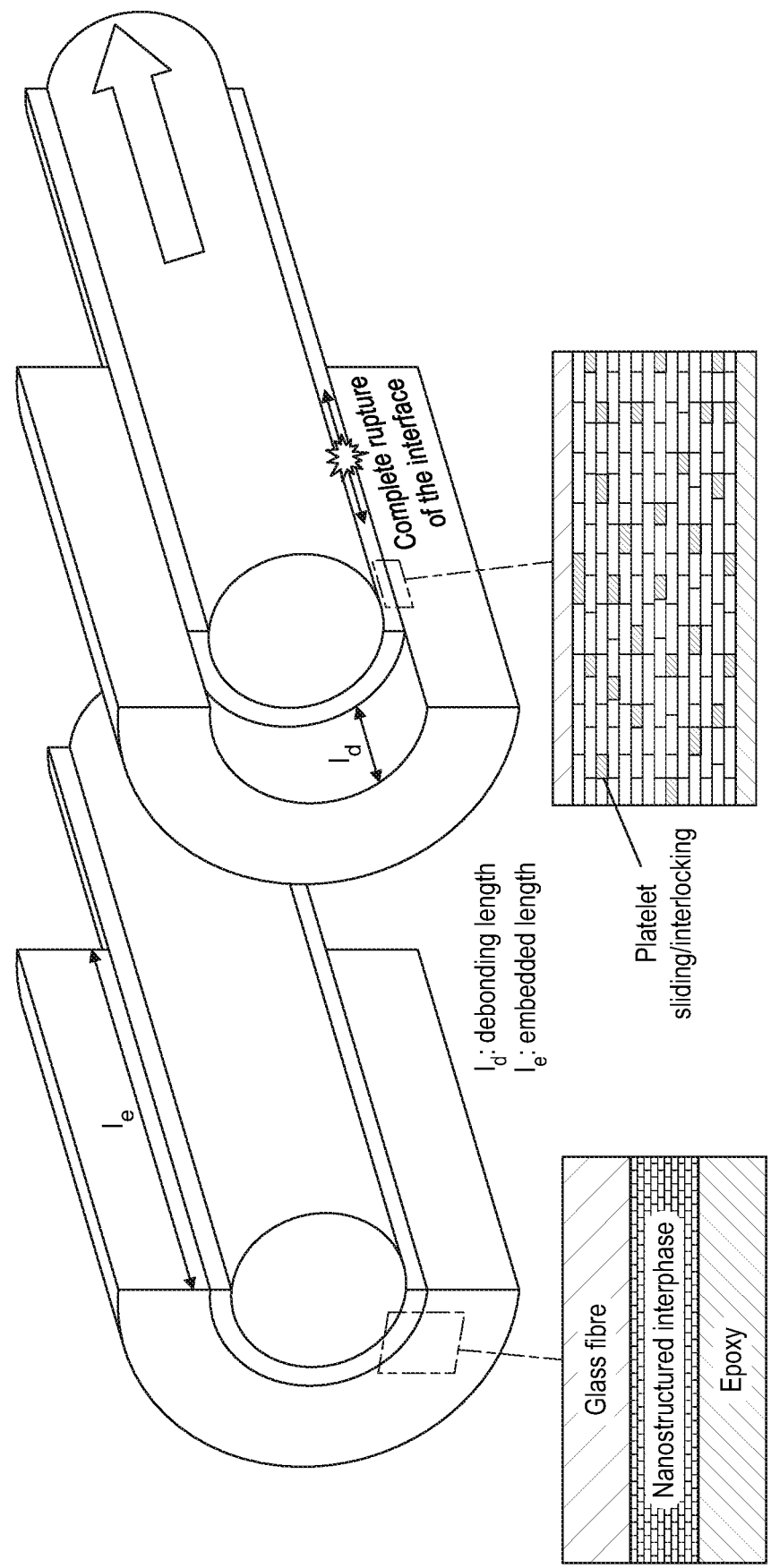
FIG. 2 shows a schematic of single coated fiber pull-out geometry of glass fibers coated with PDDA/(PSS/LDH)$_n$ nanostructured coating (A). IFSS and debonding extension length of the different systems (B, and C, respectively).
Figure 2B:
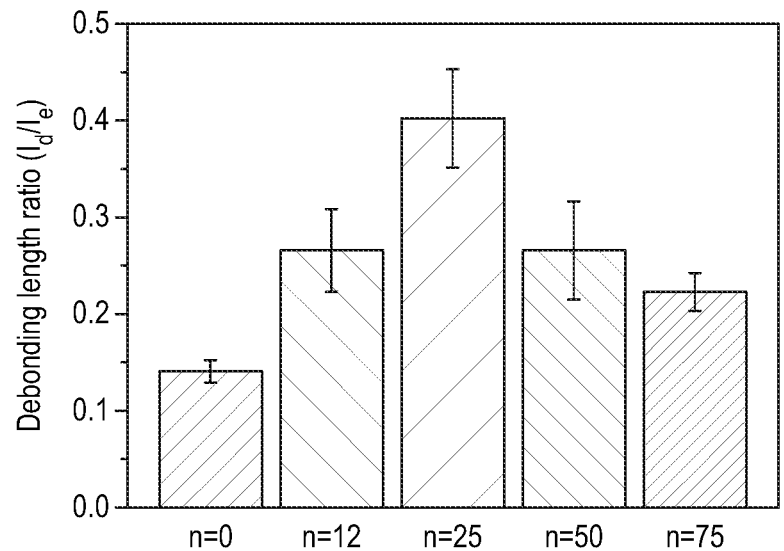
Figure 2C:
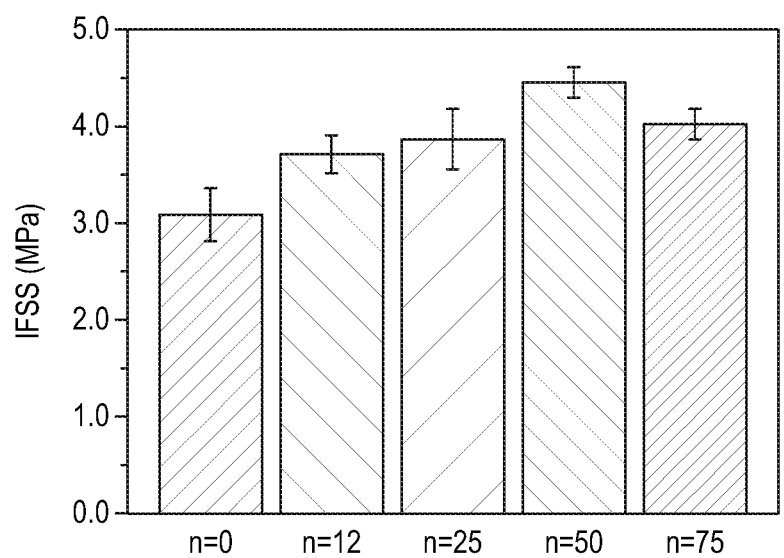

The strain hardening of the coating and, therefore, the ability of the interphase to slide whilst transferring load is the key to the overall concept. Hence, the debonding extension length along which the fiber slides prior to full interfacial failure during pull-out is of great interest. The debonding sliding ability of the fibers was investigated as a ratio ("debonding extension ratio") of the debonding length ($l_d$) over the embedded fiber length ($l_e$) (FIG. 2.A).

The interfacial shear strength (IFSS) of the different systems was determined by plotting the maximum force required to fully debond the fiber as a function of the fiber embedded area. All coated fibers present improved or similar IFSS, excluding those coated with 75 bilayers, confirming a good load transfer between the fiber and the matrix in presence of the nanostructured interphase. An increase in IFSS of up to 23% compared to the bare fibers was observed for the coated fibers. The mechanism responsible for the increase of the IFSS still remains unclear. However, one can assume that the addition of a nanostructured coating could increase the shear modulus of the interphase as well as allows for a reduction in stress concentration through individualization of the LDH platelets rather than agglomeration within the "brick-and-mortar" structure, which was also observed for interphases containing graphene oxide nanoplatelets. Both bare glass fibers and fibers coated with PDDA/$(PSS/LDH)_{12}$ coating contain "small"—50 nm-wide LDH and "optimized"—130 nm-wide LDH were embedded in epoxy for pull-out tests in order to verify the importance of a strain hardening coating on stable fiber sliding during debonding prior to full interfacial failure. When "optimized"-LDH platelets are used to produce a nanostructured interphase, the fibers slide over a much greater length, leading to a debonding extension ratio of 0.26, twice that of the bare fibers. "Optimized"-LDH platelets, confined in about 10 wt. % polymer, slide over one another and eventually interlock giving rise to strain hardening in shear and, therefore, stable sliding of the fiber within the epoxy matrix. Hence, the strain hardening character of the interphase allows for a ductile and progressive failure of the fiber/matrix interface and a larger debonding extension ratio.

The use of a thicker fiber coating, with a thickness of about 0.4 µm (25 bilayers), was found to further improve the debonding extension ratio of the fibers to 0.4, likely due to a greater number of platelets sliding and interlocking during pull-out while maintaining a high degree of platelet alignment. Further increase in coating thickness to about 0.8 and 1.2 μm (50 and 75 bilayers, respectively), resulted in a decrease of the debonding extension ratio, but still remained larger than that of the bare fibers. The reduction in the debonding extension ratio at high coating thickness may be due to a poor level of interaction between the matrix and the coating caused by a decrease in the clamping force. Indeed, the radial clamping force occurring through shrinkage of the epoxy resin during curing may decrease as a result of the radial compliance of the coating, especially at high coating thickness.

Figure 3A:
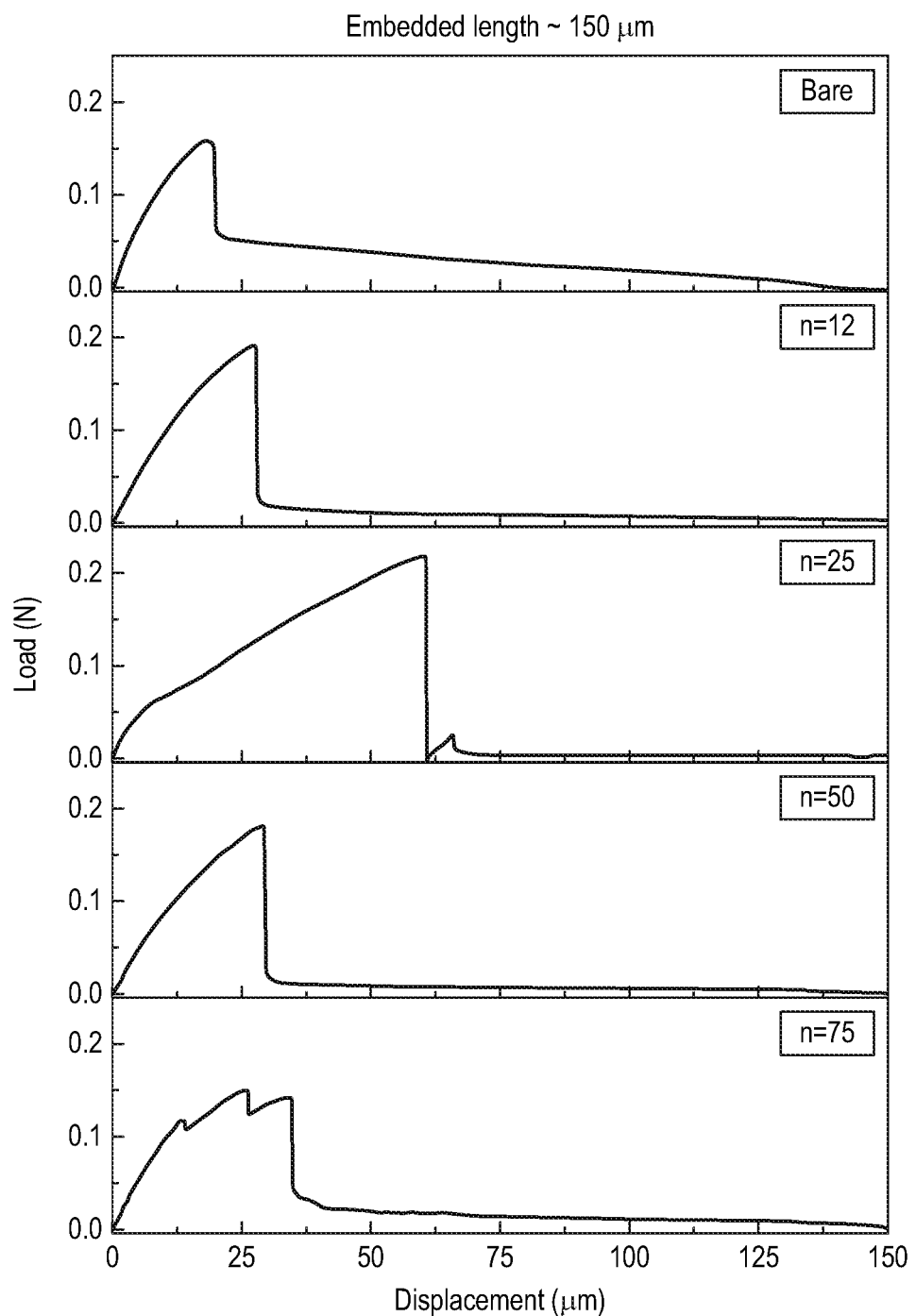
FIG. 3 shows pull-out toughness of glass fibers embedded in epoxy as a function of the type of interphase. Load-displacement pull-out curves of all systems (A). Overall pull-out toughness (B), debonding toughness (B) and extraction toughness (D).
Figure 3B:
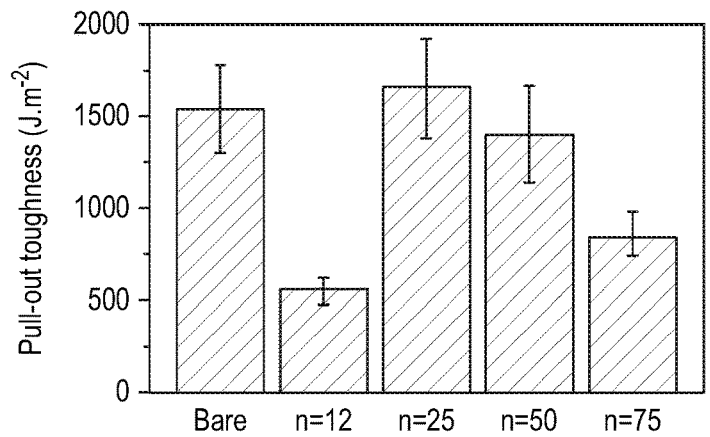
Figure 3C:
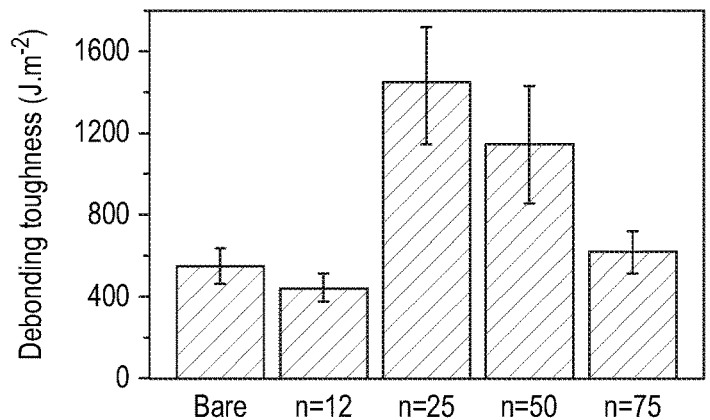
Figure 3D:
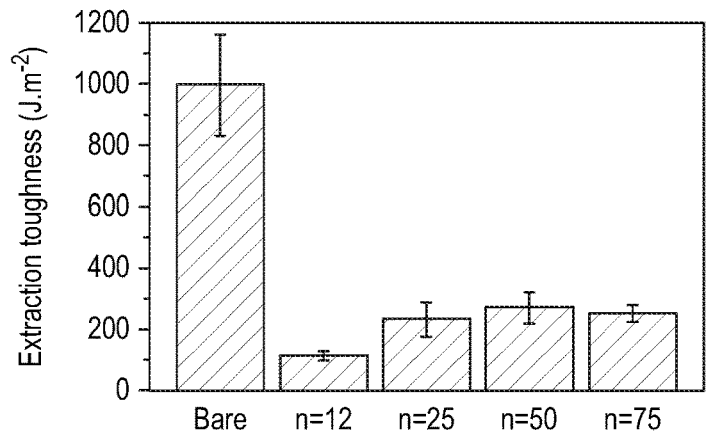

The load-displacement curves of the different fiber systems illustrate the significant extension of fiber sliding during debonding prior to complete interfacial failure when coated with a nanostructured coating. The initial loading segments of the fiber during pull-out remain fairly similar for all systems and progressively bend for the coated fibers, especially for PDDA/(PSS/LDH)$_{25}$ coated fibers, signature of a ductile debonding process leading to large extension ratio (FIG. 3A). Therefore, the early onset of debonding seems to arrests in the case of coated fibers, leading to progressive rather than sudden failure of the nanostructured interphase at higher debonding loads. The variations in the pull-out toughness, which can be divided into two parts, the debonding and extraction toughness, are manifested in the different shapes of the load-displacement pull-out curves.

The pull-out toughness of the different systems was quantified from single fiber pull-out tests, focusing on both the energy absorbed during the fiber/matrix debonding $l_d$ as well as the energy related to the frictional extraction of the fiber after interface failure (FIG. 3). While both bare and PDDA/(PSS/LDH)$_{25}$ coated glass fibers possess a similar pull-out toughness, all other coated fibers exhibit reduced toughness (FIG. 3.B). By dividing the pull-out toughness of a fiber into two parts, namely, the debonding toughness (FIG. 3.C) and the extraction toughness (caused by friction of the debonded fiber when sliding within the matrix) (FIG. 3.D), it appears that coated fibers lead to a significant improvement in debonding toughness. Indeed, PDDA/(PSS/LDH)$_{25}$ coated fibers present a debonding toughness about three times higher than that of bare fibers. The increase in debonding toughness is a result of platelet sliding/interlocking in the interphase while loaded in shear, leading to progressive debonding and large fiber stable sliding prior to full delamination. However, the extraction toughness of such coated fibers from the resin after failure of the interface is substantially reduced, partly due to the removal of the coating during interface failure. The debonding toughness for nanostructure-coated fibers represents approximately 75% of the overall pull-out toughness compared to about 35% for the bare fibers.

Since the fibers are expected to fragment multiple times within the fiber reinforced polymer composites during loading and, therefore, slip while assuring redistribution of the stress, the debonding toughness is of greater importance. Indeed, substantial energy can be dissipated within the composite leading to an increase of the overall toughness of the material. Hence, it is important that the fibers fragment without localization of stress concentrations to avoid the formation of a cluster of fiber breaks. In order to investigate the distribution and dissipation of stress arising from a fiber fragment via birefringence pattern of the fiber/matrix interface, single fiber fragmentation tests were carried out under a microscope using cross-polarized light. PDDA/(PSS/LDH)$_{75}$ coated fibers were investigated and compared to bare fibers.

Birefringence patterns arising from stresses at the interface between the fiber and the matrix revealed significant differences in stress distribution and absorption in the vicinity of a fiber fragment when comparing bare and coated fibers embedded in epoxy. While the fragmentation of bare fibers in epoxy leads to localized and intense stress concentration at the interface, the nanostructured fiber/matrix interphase provides the ability to reduce and spread the stresses arising from fiber breakage along the fiber length as indicated by birefringence patterns, likely through crack deflection within the anisotropic interphase and progressive debonding. The nanostructured interphase enables the dissipation of the stresses along the fiber length. Therefore, stresses were evidenced to locally accumulate near a fiber break in the case of bare fibers, whereas coated fibers exhibit the ability to spread the stresses along their length.

Figure 4A:
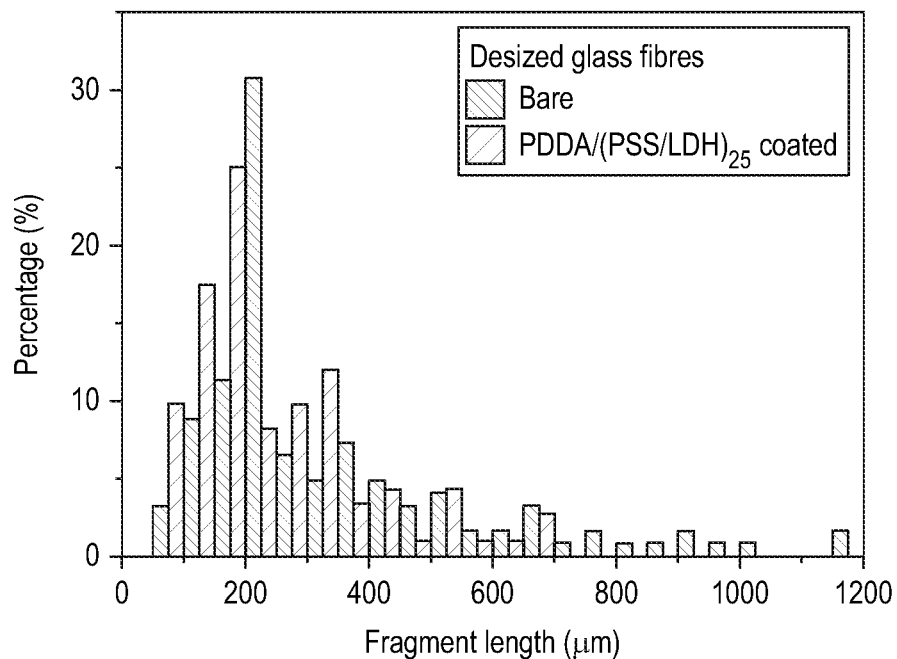
FIG. 4 shows the effect of the interphase on stress distribution near fiber fragments and fragment lengths distribution in single glass fiber composites. Histogram (A) and cumulative (B) fragment length distribution for bare and PDDA/(PSS/LDH)$_{25}$ coated glass fibers.
Figure 4B:
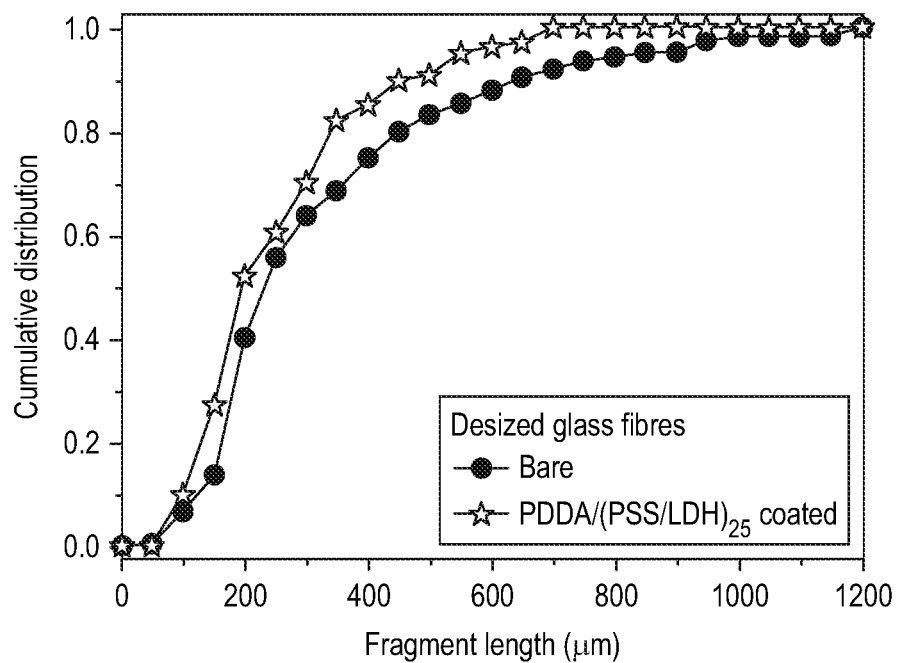
Figure 5A:
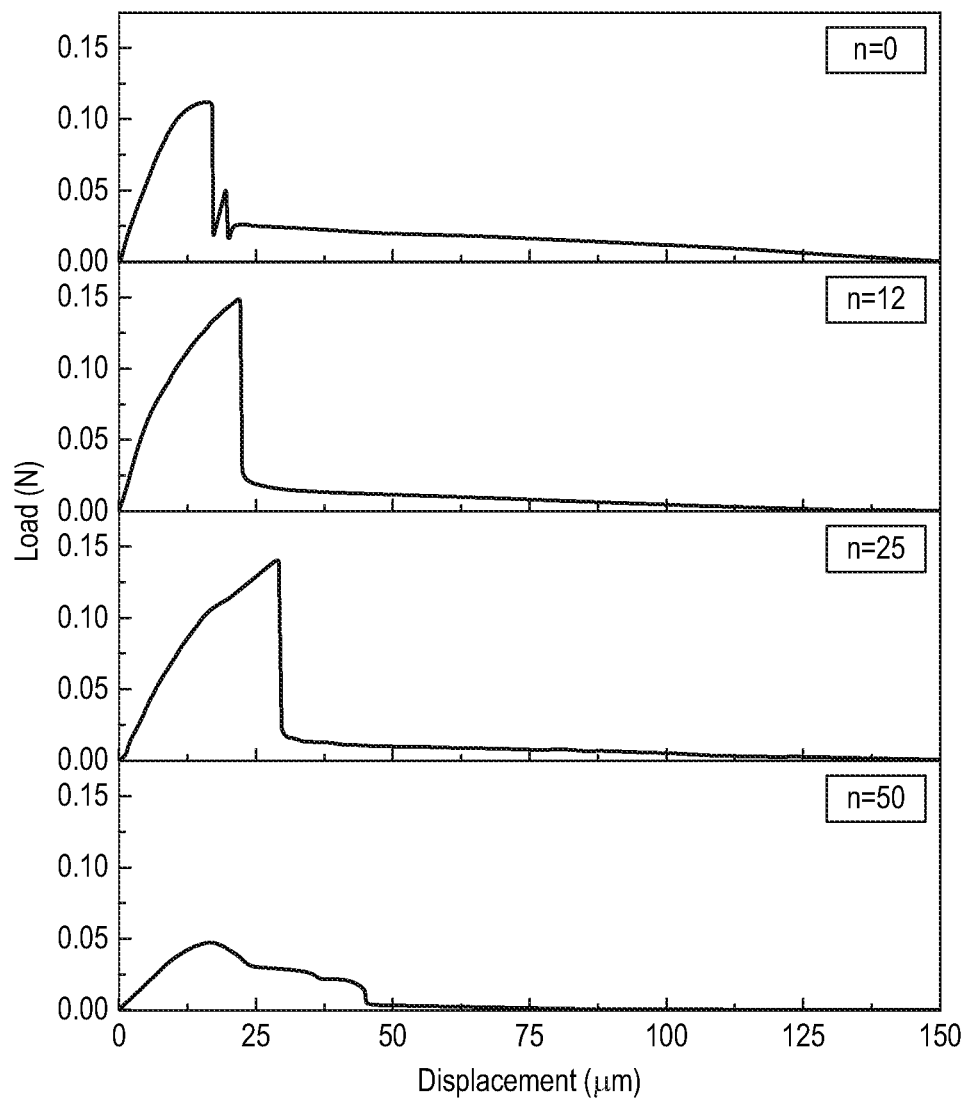
FIG. 5 shows pull-out tests of unsized carbon fibers coated with PDDA/(PSS/LDH)$_n$. Load displacement curves of the pull-out tests (A) and the associated maximum force applied to the fiber plotted as a function of the fiber embedded area in the matrix (B). Interfacial shear strength and debonding length ratio were measured as a function of the thickness of the coating (C and D, respectively).
Figure 5B:
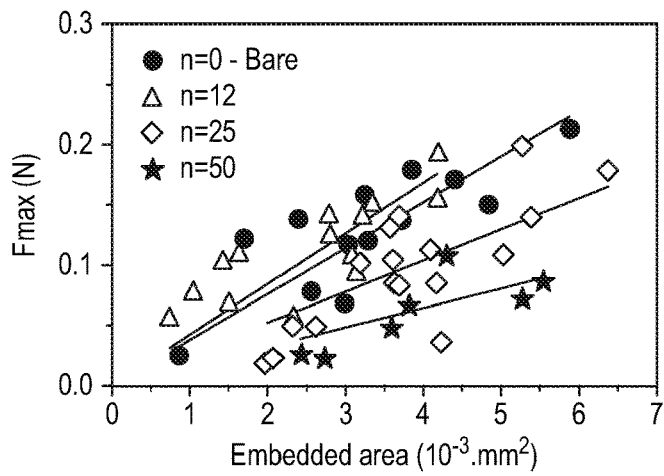
Figure 5C:
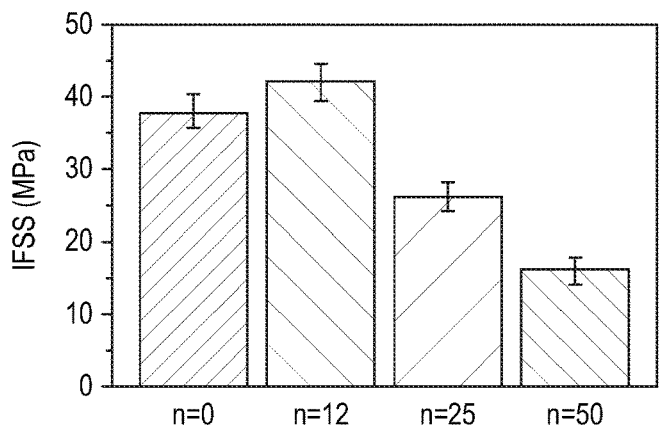
Figure 5D:
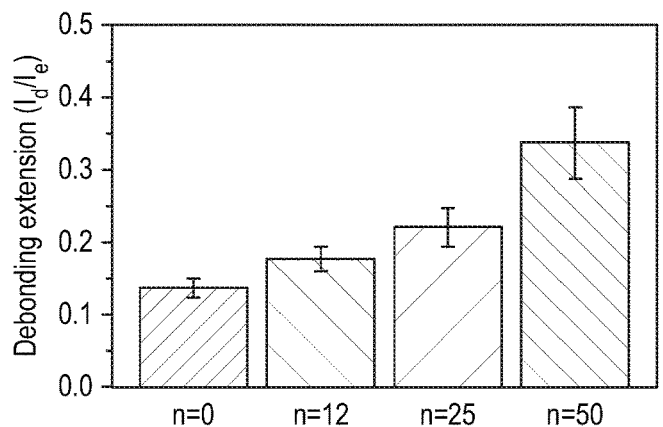

The fiber fragment lengths obtained after fragmentation saturation of the fiber were measured and distributed both in histograms and cumulatively (FIG. 4). The mean fiber fragment length (l) was therefore obtained from the median value of the cumulative distribution for both bare and coated glass fibers. The distribution of the fiber fragment lengths appeared to be slightly shifted towards smaller values when coated with a PDDA/(PSS/LDH)$_{25}$ nanostructure coating, as a result of a stronger interface. Similarly, the cumulative distribution of the fragment levels off at smaller fragment lengths in the case of the coated fibers. A mean fragment length of 315±22 and 260±17 μm was measured for bare and coated fibers, respectively. The improvement in IFSS of the fiber/epoxy interface with the presence of a nanostructured interphase was assessed from the fiber critical fragment length ($l_c$), using the Kelly-Tyson model. Assuming a similar tensile strength for the glass fibers at critical fragment lengths of 420±29 and 347±22 μm (bare and coated fibers critical fragment lengths, respectively), an estimation of the improvement in the IFSS of about +21% was achieved for PDDA/(PSS/LDH)$_{25}$ coated glass fibers as compared to bare glass fibers. The increase in IFSS is in good agreement with the results obtained from pull-out tests. A nanostructured fiber/matrix interphase enables for longer stable sliding of the fiber during progressive debonding, while assuring good stress transfer as well as stress dissipation along the fiber.

A nanostructured coating was successfully deposited onto the surface of glass fibers, providing novel interphase toughening mechanisms for fiber-reinforced composite materials without compromising the fiber/matrix adhesion. Absorption and spreading of stress concentrations arising from fiber fractures followed by large fiber debonding extension ratio were observed during single fiber model composite tests. Stresses relieved by the fragmentation of glass fibers were dissipated within the nanostructured anisotropic fiber/matrix interphase along the length of the fiber, potentially reducing the localization of intense stresses at the neighboring fibers in fiber-reinforced composite model. The stable sliding of the nanostructured coated fibers within the matrix during debonding, after fragmentation, was determined to be about four times higher than that of bare fibers. The nanostructured fiber/matrix interphase improves the mechanical performance of fiber-reinforced composites by reducing fiber break accumulation and allowing for extended strain to failure via a longer and stable fiber sliding.

Carbon Fibers

Similarly to glass fibers, carbon fibers were investigated as high performance fiber reinforcements for the development of composites with nanostructured interphase. Therefore, the Layer-by-Layer deposition process previously developed to coat bundles of glass fibers was also used to coat bundles of carbon fibers, using a PDDA precursor layer prior to nanostructure coating deposition.

LDH Monolayer Deposition

Both commercially-sized and unsized carbon fibers, which possess a slightly negatively charged surface with a zeta potential of about −20 mV at pH 10, were coated with a LDH monolayer to assess the possibility to assemble PDDA/(PSS/LDH)n multilayer coatings. Since sized fibers exhibit a rougher surface than unsized carbon fibers due to uneven spreading of the commercial sizing, an irregular LDH monolayer was deposited onto sized fibers with bald regions. On the other hand, the smooth surface of unsized fibers did allow for the deposition of LDH monolayer with good coverage.

Surface Morphology on Carbon Fibers

PDDA/(LDH/PSS)n coatings with 12, 25, 50 and 75 (PSS/LDH) bilayers were deposited on bundles of unsized carbon fibers containing a few hundred fibers. The morphology of the coating top surface was investigated by SEM, which revealed a good deposition of the coatings with a number of (PSS/LDH) bilayers as high as 50.

Cross-Section on Carbon Fibers

The thickness of coatings made of a number of bilayers up to 25 was found consistent with the dimensions of the LDH platelets. A uniform coating thickness of about 200 and 400 nm was measured on unsized carbon fibers after the deposition of PDDA/(PSS/LDH)12 and PDDA/(PSS/LDH)25, respectively.

The thickness of the removed PDDA/(PSS/LDH)50 coating was roughly estimated about a micrometer, which is in agreement with a repeatable LbL deposition.

Bare unsized carbon fibers, as well as fibers coated with 12, 25 and 50 (PSS/LDH) bilayers, after the deposition of a PDDA precursor layer, were mechanically investigated using pull-out tests.

Interphase Characterization Via Single Fiber Pull-Out Tests

The interfacial properties between the carbon fibers and an epoxy resin were tested, along with the response of the nanostructure coating in shear, via pull-out tests. Bare unsized carbon fibers show an elastic linear loading of their interface with epoxy prior to sudden failure, combined with a high level of friction during fiber extraction from the matrix (FIG. 4 A). In contrast, coated fibers exhibit additional plastic deformation of the interface during loading, as a result of the deformation of the coating in shear, as well as a low level of friction with the matrix when being extracted.

The interfacial shear strength (IFSS) of the different fiber/matrix systems were measured by plotting the maximum load carried by the interface at failure as a function of the fiber embedded area in the matrix (FIG. 5 B). An increase of about 11% in the IFSS was measured for the PDDA/(PSS/LDH)$_{12}$ coated fibers as compared to bare fibers (FIG. 5 C). Further increases in the thickness of the coating deposited on the carbon fibers led to a progressive decrease in the IFSS, which correlates with the previous SEM observations.

Platelet sliding and subsequent interlocking is expected to occur during the loading of the fiber interface in shear, leading to substantial plastic deformation. A stable and progressive sliding of the fiber is therefore possible during the loading of the fiber interface until full debonding with the matrix. The length along with the fiber tends to slide during the debonding phase of the pull-out test appears to increase with the thickness of the coating (FIG. 5 D). The fibers coated with PDDA/(PSS/LDH)$_{12}$, exhibiting a higher IFSS than bare fibers, represent a good improvement with stable slippage of the fiber through plastic deformation of the coating in shear. The fibers coated with PDDA/(PSS/LDH)$_{12}$ present an elastic loading of the interface to a load comparable to that of bare fiber followed by plastic deformation causing fiber sliding, as desired.

The overall pull-out toughness of the coated fibers is limited by the loss in friction with the matrix during extraction. Indeed, a reduction of about 30% in the overall pull-out toughness was measured for all coated fibers, mainly caused by a decrease of about 60% in the extraction toughness. The debonding toughness of PDDA/(PSS/LDH)$_{25}$, was not significantly higher than that of bare fiber. Thicker coatings show a progressive decrease in the debonding toughness due to poor IFSS. When comparing the amount of toughness related to the debonding and the extraction of the fibers, it is clear that the main source of toughening of coated fibers is associated to debonding. About 70% of the overall pull-out toughness of coated fibers arises from debonding mechanism, whereas it is closer to 50% for bare fibers.

Carbon Fiber Surface Modification

As a route to modify the surface of unsized carbon fibers and, therefore, increase the attraction between the coating and the fiber, oxidation of the fiber surface was carried out. Indeed, oxygen-containing groups on the surface of the carbon fiber deprotonate especially carboxyl groups, leading to a negatively-charged surface at high pH. On the other hand, quaternary-terminated amine surface modification of carbon fiber surface was also investigated as a route to a positively charged surface.

Oxygen Plasma Treated Carbon Fibers

The surface of unsized carbon fibers were treated with a low pressure oxygen plasma treatment in order to retain the mechanical properties of the fibers while oxidizing their surface. Three different exposure times to plasma under an oxygen flow rate of 50 sccm were investigated, namely 30 seconds, 5 minutes and 20 minutes. Both the morphology and composition of the treated surface were analyzed and compared to that of untreated fibers.

Qualitative comparison of fiber surface roughness was undertaken by SEM. An obvious increase in fiber surface roughness was observed through an amplification of the ridge features present on the surface of the carbon fibers (crenulations), which result from their manufacturing process. When treated up to 5 minutes, the roughness appears to increase slightly but then starts to drastically rise for longer exposure time such as 20 minutes.

Figure 6:
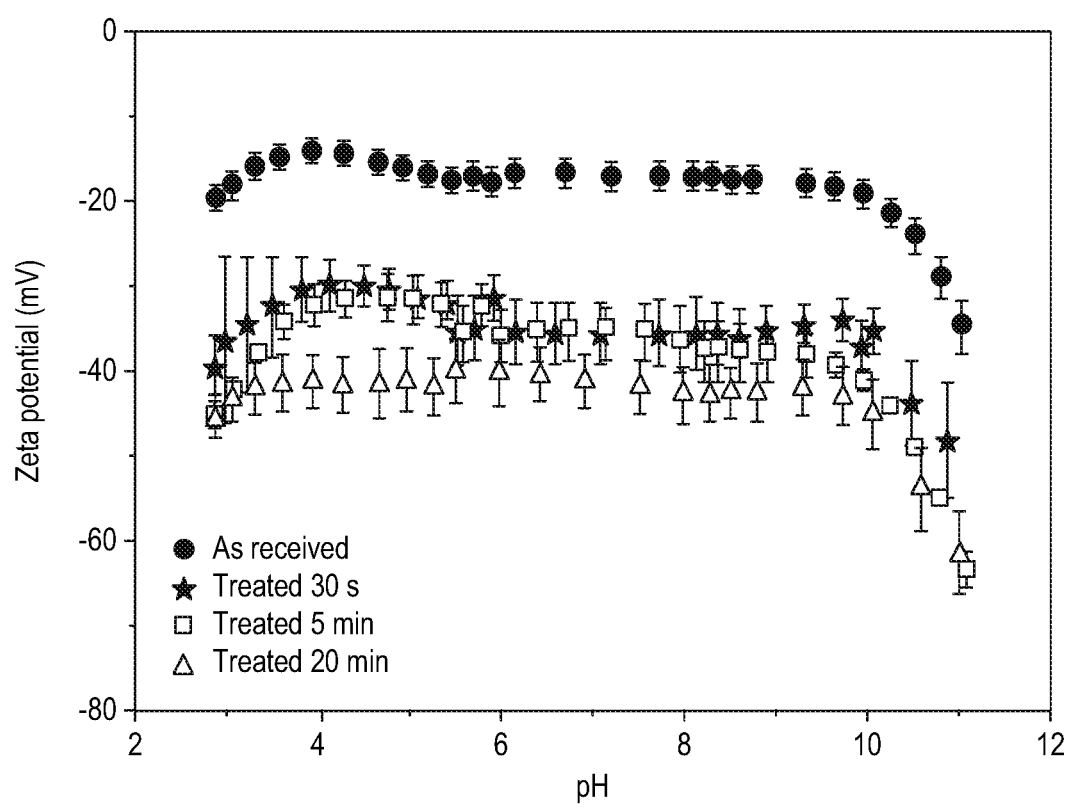
FIG. 6 shows surface charge of plasma treated unsized carbon fibers. Zeta potential curves of untreated and treated fibers from pH 3 to pH 11 in 5 mM KCl.

As predicted, the zeta potential of plasma treated fibers at pH 10 (pH used for the LbL assembly of nanostructure coating) was found to be significantly more negative than bare fibers (FIG. 6). The improvement in the absolute value of the streaming zeta potential of the treated fibers does not seem to increase significantly for plasma exposure times longer than 5 minutes.

Figure 7:
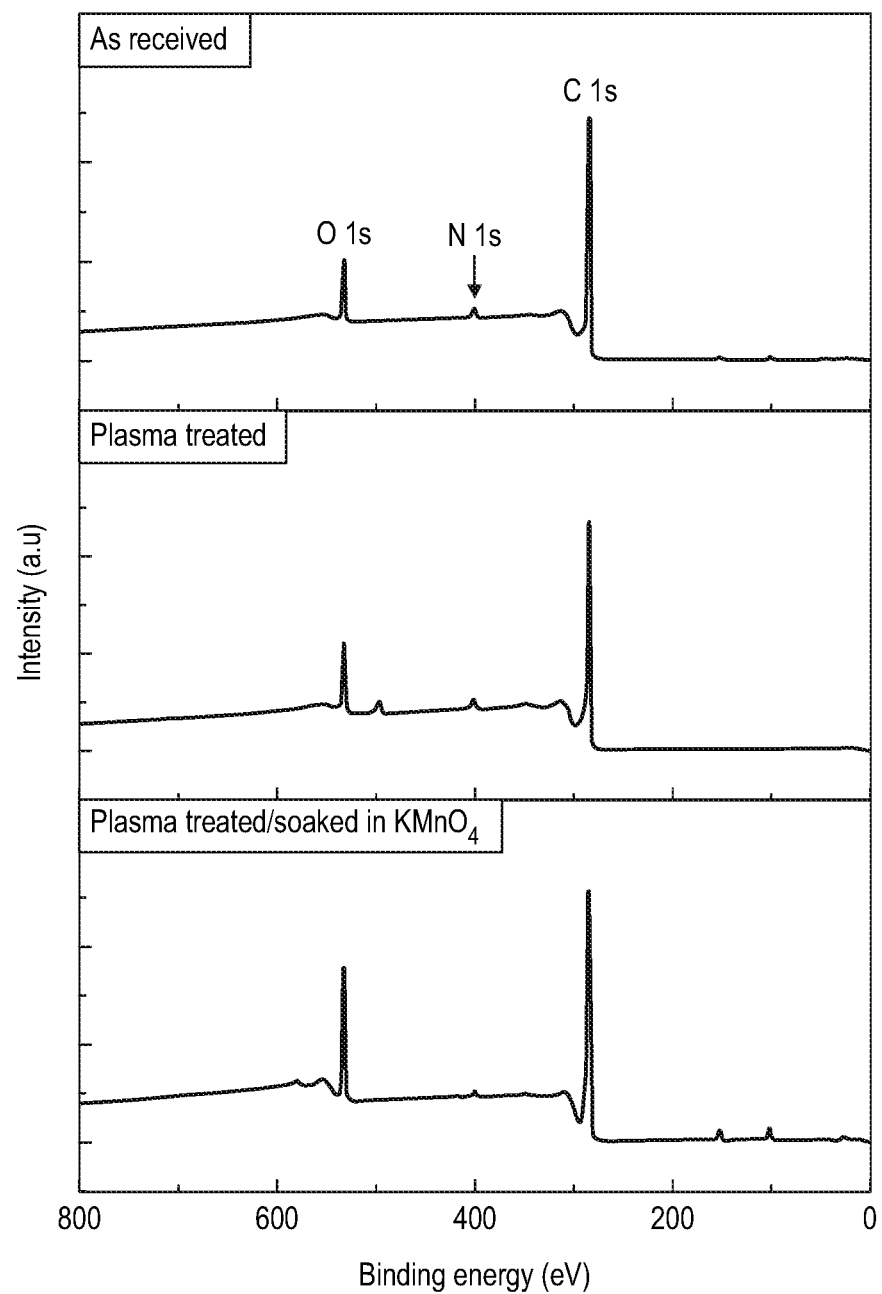
FIG. 7 shows the investigation of surface chemistry of oxidised carbon fibers. XPS spectra of as received, plasma treated for 5 minutes and plasma treated for 5 minutes followed by dipping in a KMnO$_4$ solution carbon fibers.
Figure 8C:
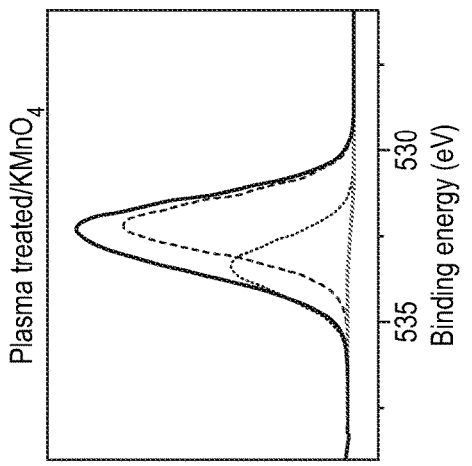
FIG. 8 shows oxygen and carbon XPS peak investigation. Oxygen and carbon peak of as received (A and D, respectively), plasma treated (B and E, respectively) and plasma treated followed by dipping in KMnO$_4$ (C and D, respectively).
Figure 8F:
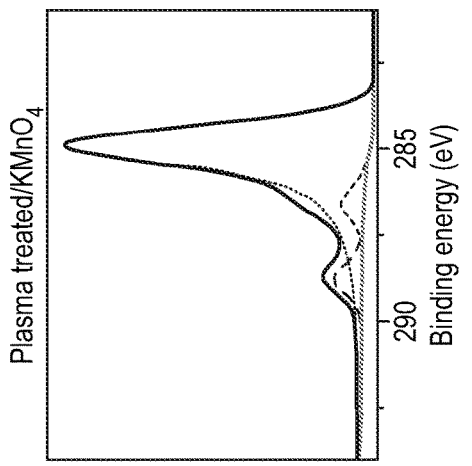
Figure 8B:
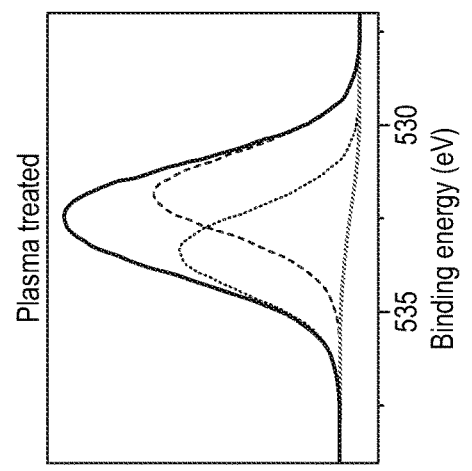
Figure 8E:
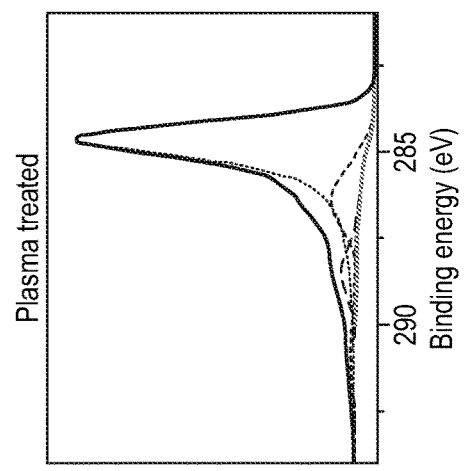
Figure 8A:
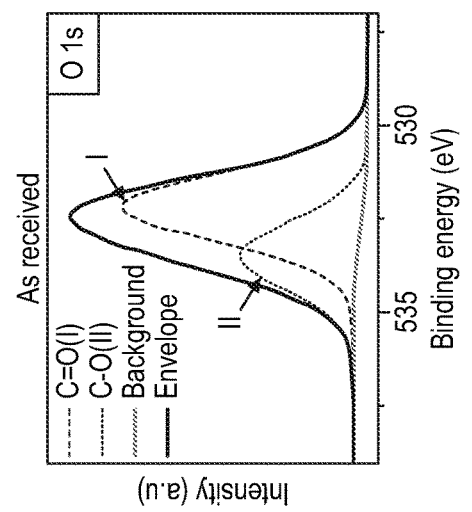
Figure 8D:
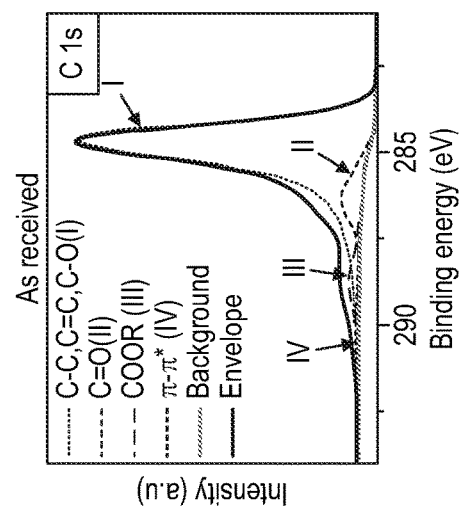

The surface chemistry of the bare carbon fibers as well as fibers treated for 5 minutes was investigated via XPS (FIG. 7). In addition, an additional oxidation step was introduced by dipping the plasma-treated fibers into a solution of $KMnO_4$. This additional liquid phase is expected to increase the number of carboxyl groups present on their surface, through conversion of hydroxyl groups.

Some changes in the oxygen peak of the XPS spectra for the different type of fibers were observed. Indeed, the height of the oxygen peak appears to increase after plasma treatment and even further for treated fibers dipped in $KMnO_4$ (FIG. 8).

The oxidation of the carbon fiber surface via a low pressure plasma under a flow of oxygen led to an increase in the content of oxygen-containing groups. An oxygen atom ratio of 11% compared to 9.1% was measured for plasma-treated fibers and bare fibers, respectively.

| Carbon fibre | O/% | C═O/% | C—O/% |
|---|---|---|---|
| As received | 9.1 | 67.3 | 32.7 |
| Plasma | 11.0 | 54.5 | 45.5 |
| Plasma + KMnO4 | 15.8 | 65.9 | 34.1 |

Among the oxygen-containing groups present on the surface of the fibers, the relative proportion of C═O carbonyl groups appears to be slightly reduced, from 67.3 to 54.5% after plasma treatment. By further oxidising the fibers in KMnO4, the proportion of oxygen atoms on the surface were measured about 65.9% with a ratio of C═O carbonyl group about 65.9%, confirming the successful conversion of hydroxyl groups into carbonyl groups.

Figure 9:
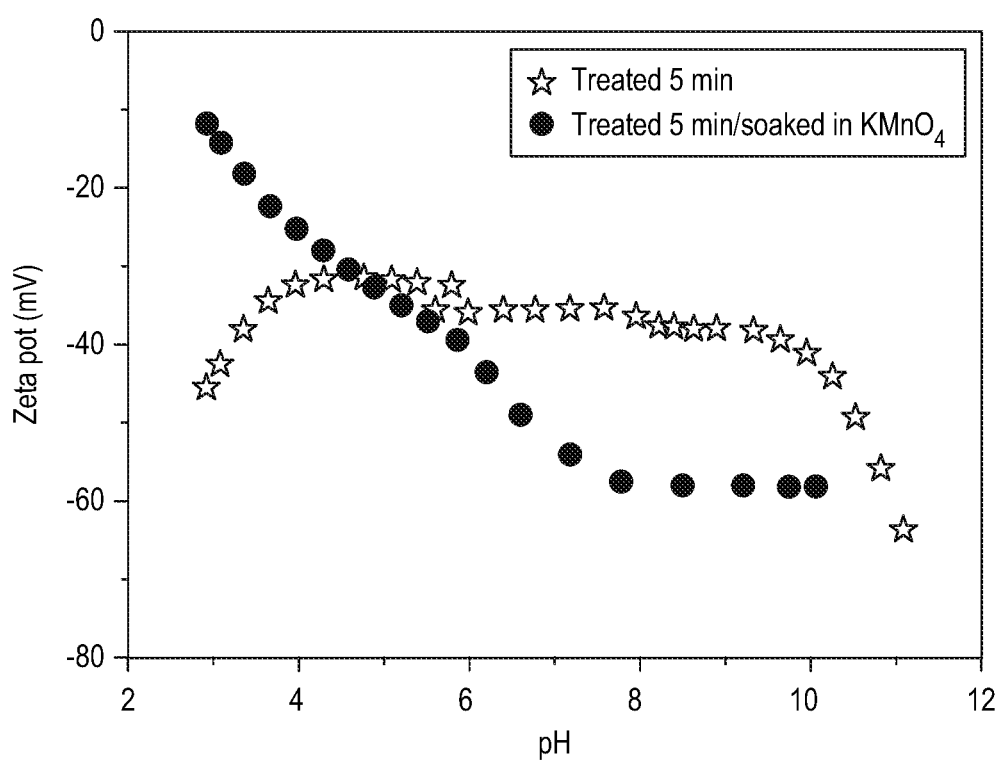
FIG. 9 shows the effect of oxidation in KMnO$_4$ on the surface charge of plasma treated carbon fibers. Zeta potential curves of plasma treated carbon before and after dipping in KMnO$_4$ from pH 3 to pH 11.
Figure 10A:
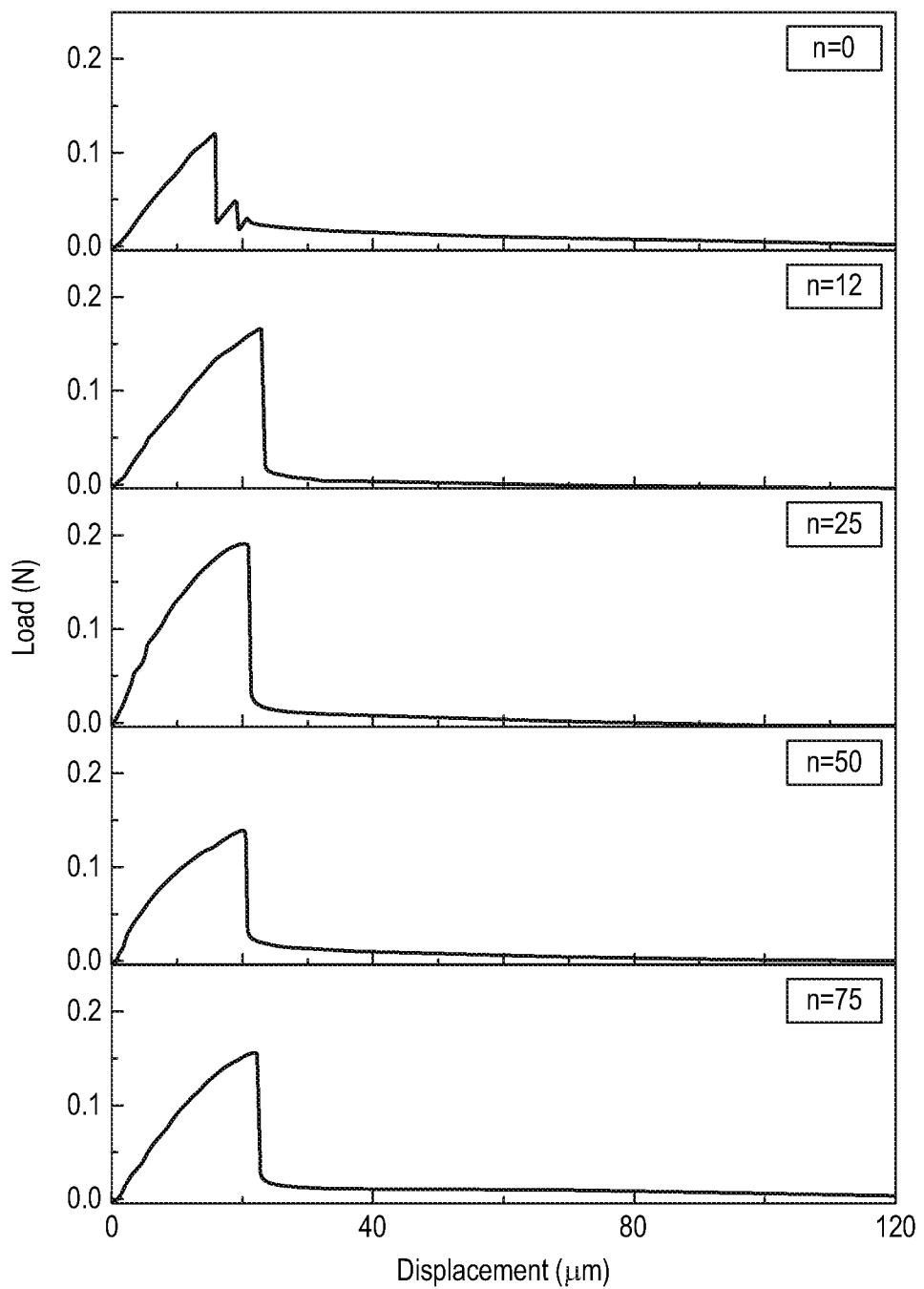
FIG. 10 shows pull-out tests of modified unsized carbon fibers coated with PDDA/(PSS/LDH)$_n$. Load displacement curves of the pull-out tests (A) and the associated maximum force plotted applied to the fiber as a function of the fiber embedded area in the matrix (B). Interfacial shear strength and debonding length ratio were measured as a function of the thickness of the coating (C and D, respectively).
Figure 10B:
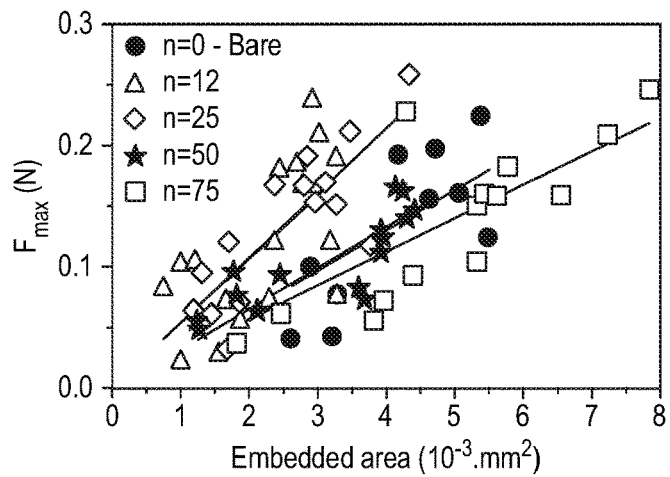
Figure 10C:
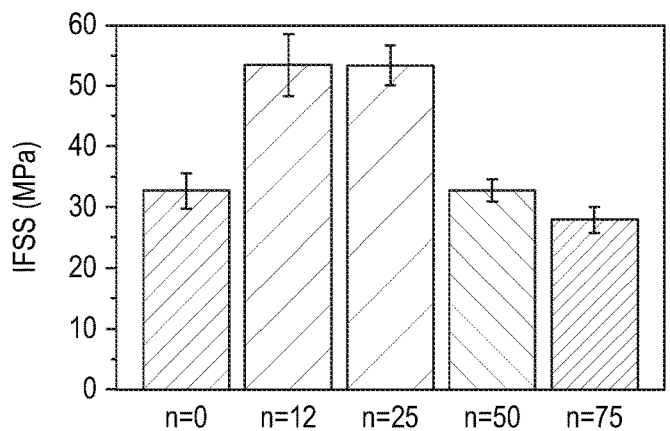
Figure 10D:
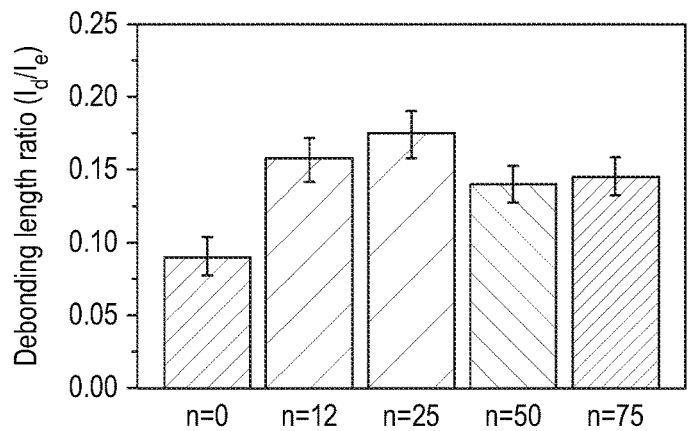

The impact of oxidation in KMnO4 of plasma treated carbon fibers on their surface charge density was then assessed by measuring their zeta potential (FIG. 9). At pH 10, a streaming zeta potential of −58 mV was measured, which represents an improvement of over 40% as compared to solely plasma treated fibers. The high streaming zeta potential value measured for the modified carbon fibers is similar to that of hydroxylated glass fibers previously used.

Coating Morphology Deposited on Modified Carbon Fibers

The deposition of PDDA/(PSS/LDH)$_n$ was successful on bundles of modified carbon fibers. Homogeneous PDDA/(PSS/LDH)$_n$ coatings with consistent thickness were observed in fiber cross-section SEM images.

Interphase characterization via single fiber pull-out tests of modified carbon fibers All treated fibers coated with different nanostructure coating thickness as well as bare fibers were tested similarly to untreated carbon fibers using pull-out tests. The load-displacement curves of the pull-out tests show that all coated fibers have a linear elastic loading segment followed by plastic deformation, signature of shear deformation of the nanostructure interphase (FIG. 10 A). On the other hand, similarly to untreated bare fibers, treated bare fibers exhibit elastic loading of the interface followed by sudden failure without any plastic deformation. Differently to untreated coated fibers, the interface of treated PDDA/(PSS/LDH)$_{12-25}$ coated fibers with the epoxy matrix is stronger as compared to treated bare fibers with an IFSS of about 53.4 and 32.4 MPa, respectively (FIG. 10 C).

The debonding length, along which the fiber can progressively slide prior to full interfacial failure, was also measured higher for coated fibers. A maximum debonding length ratio of 0.17 was measured for PDDA/(PSS/LDH)$_{25}$ coated fibers compared to 0.08 for bare modified fibers, which is in line with the results obtained from coated glass fibers. The debonding length ratio was increased by about 95% as compared to bare treated fibers.

An extension in the debonding sliding ratio, along with better or similar IFSS, led to a significant improvement in the debonding toughness with a value reaching 560 J·m$^{-2}$ for the PDDA/(PSS/LDH)$_{25}$ coated treated fibers as compared to 335 J·m$^{-2}$ for bare treated fibers. The ratio of debonding toughness over the overall pull-out toughness is in the range of 60 to 75% depending on the coating thickness, significantly higher than the 37% measured for bare fibers.

The deposition of the nanostructure coatings onto 7 μm-wide carbon fibers was successfully achieved using a Layer-by-Layer assembly on bundles of fibers. The debonding length, along which the fiber can slide prior to interfacial failure when embedded in a matrix, was improved.

The surface modification of carbon fibers via a low pressure oxygen plasma followed with further oxidation in contact with a KMnO4 solution was carried out. Consequently, a significant improvement in the surface charge density of the fibers was achieved. The zeta potential value measured for the surface modified carbon fibers is similar to that of glass fibers, about −58 mV at pH 10. The combination of high debonding length and improved interfacial shear strength was then achieved, with values about 0.17 and 53.40 MPa, respectively, higher than those obtained from bare fibers (0.09 and 37.85 MPa, respectively). Significant improvement in the debonding toughness (560 J·m$^{-2}$) was measured as compared to bare fibers with an increase of about 67%.

Similarly to glass fibers, untreated and treated carbon fibers coated with nanostructure coatings exhibit a poor level of friction with the matrix during the extraction part of the pull-out test, suggesting a delamination of the coating during the interfacial failure process. Indeed the extraction toughness of the pull-out test represents about 25% of the overall pull-out toughness in the case of coated fibers, whereas it is close to 50% for bare fibers. The typical extraction toughness of bare and coated fibers is about 500 and 200 J·m$^{-2}$, respectively. However, at a composite level, the fiber debonding process is predominant over the extraction. Therefore, higher debonding toughness and debonding length ratio will lead to an improvement in composite toughness and strain to failure.

Figure 11A:
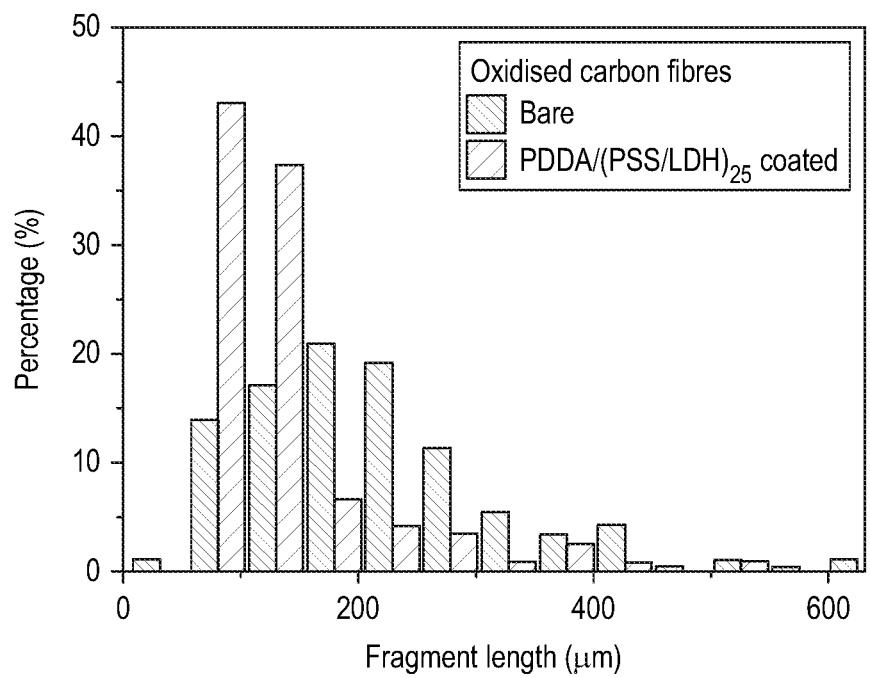
FIG. 11 shows the effect of interphase on stress distribution near fiber fragments and fiber fragment length distribution in surface-oxidized carbon fiber composite. Histogram (A) and cumulative (B) fragment length distribution for bare and PDDA/(PSS/LDH)$_{25}$ coated surface oxidized carbon fibers.
Figure 11B:
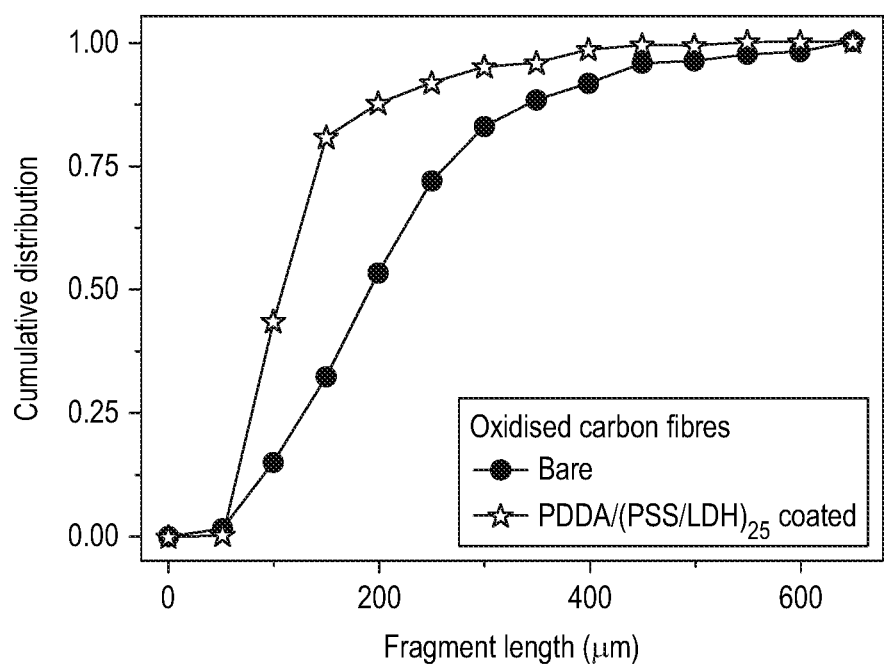

Similar to the observations reported for bare and coated glass fibers, two different stress field formation behaviours were observed during fragmentation of the single carbon fibers. While bare surface oxidised carbon fibers exhibit an intense and large stress field building up near a fiber fragment, on the other hand coated surface oxidised carbon fibers present a less intense stress field, which seems to spread along the length of the fiber (FIG. 11). Continuous imaging of the stress field arising in fragmented single fiber composite with nanostructured interphase allowed evidencing of the progressive propagation of the stress concentration during sliding of the fiber accompanied in an absolute reduction of the intensity of the stress field. Significant improvement in IFSS, about 74%, of the modified carbon fiber/epoxy matrix interface was evidenced by single fiber pull-out tests when adding a PDDA/(PSS/LDH)$_{25}$ nanostructured interphase as compared to a system without the nanostructured interphase. Single fiber fragmentation tests were therefore carried out to confirm the improvement in IFSS while reaching fiber fragmentation saturation at a strain of about 25%. The fragment lengths were measured to determine the mean fragment length (l) of each single fiber composite model. A mean fragment length of 212±11 and 137±9 μm was measured for bare and coated surface oxidised carbon fiber models, respectively. By plotting the histogram and cumulative distribution of the fragment lengths of coated and bare fibers, it becomes clear that the fragment lengths of the coated fibers are shifted towards shorter lengths (FIG. 11). A critical fragment length (lc) of 283±14 and 182±12 μm was deducted using the Kelly-Tyson model. Assuming a constant tensile for both models at these critical fragment lengths, the ratio between the critical fragment lengths directly relates to the improvement made in term of IFSS. Therefore, the fragmentation tests of the two single fiber composite indicates an increase of about 56% in IFSS in the case of the composite with nanostructured interphase, which is in good agreement with the conclusions drawn from single fiber pull-out tests.

The mechanical properties of the systems obtained from untreated and treated coated carbon fibers along with those of the control systems are presented in the table below:

| Unsized carbon fibre | Interphase | IFSS/MPa | Debonding length ratio\a · u | Pull-out T./J · m$^{-2}$ | Debonding T./J · m$^{-2}$ | Extraction T./J · m$^{-2}$ |
|---|---|---|---|---|---|---|
| Untreated | Control | 37.85 ± 2.42 | 0.138 ± 0.012 | 1043 ± 151 | 496 ± 85 | 509 ± 94 |
|  | n = 25 | 25.96 ± 1.92 | 0.221 ± 0.026 | 729 ± 105 | 501 ± 75 | 212 ± 48 |
| Treated | Control | 32.39 ± 3.24 | 0.089 ± 0.013 | 866 ± 148 | 335 ± 75 | 531 ± 97 |
|  | n = 25 | 53.4 ± 3.46 | 0.173 ± 0.016 | 756 ± 61 | 560 ± 64 | 195 ± 25 |

The best results were obtained from oxygen plasma treated (for 5 minutes) and dipped in a KMnO4 solution carbon fibers coated with PDDA/(PSS/LDH)25, similarly to glass fibers. Improvement in IFSS, debonding length ratio and, therefore, debonding toughness was achieved.

An example for the optimisation of the structure for a given fiber and nanoplatelet system is given below.

An analytical resolution of equation (3) leads to a direct relation between the diameter of the fiber and the maximum platelet width, while taking into account the phase proportion requirement (90:10), as a function of the aspect ratio (s) of the platelets. The maximum platelet width, obtained from both equations (3) and (5), can be plotted as a function of the fiber diameter (FIG. 13).

Figure 13A:
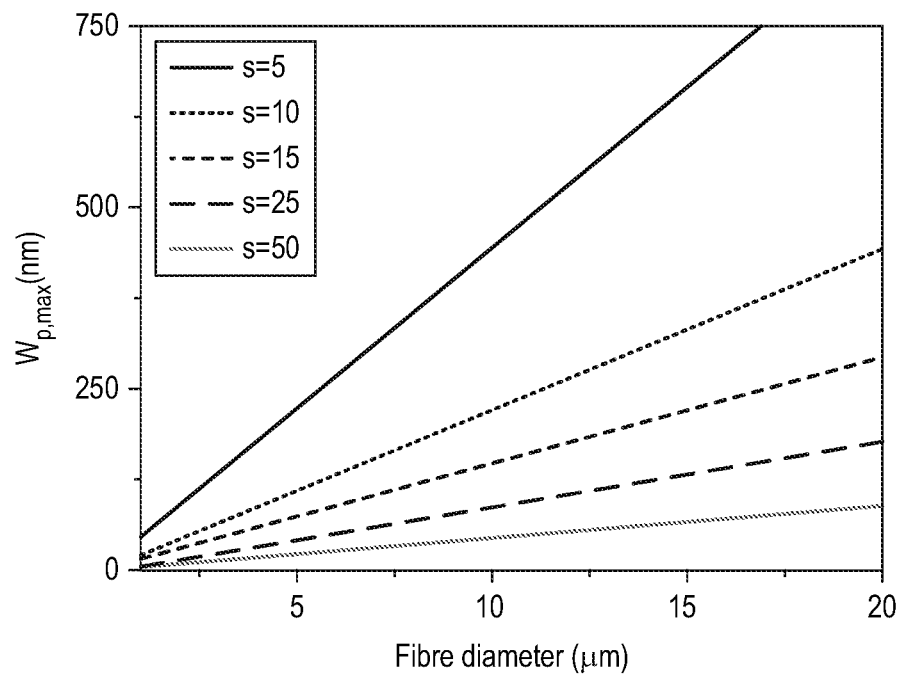
FIG. 13 shows an analytical approach to the relation between fiber diameter and maximum platelet width. $W_{p,max}$=f(r) for varying aspect ratio obtained from equation (3) (A) with a phase proportion constraint of 90:10 and $W_{p,max}$=f(r) obtained from equation (5) at a fixed aspect ratio of 10 (B).
Figure 13B:
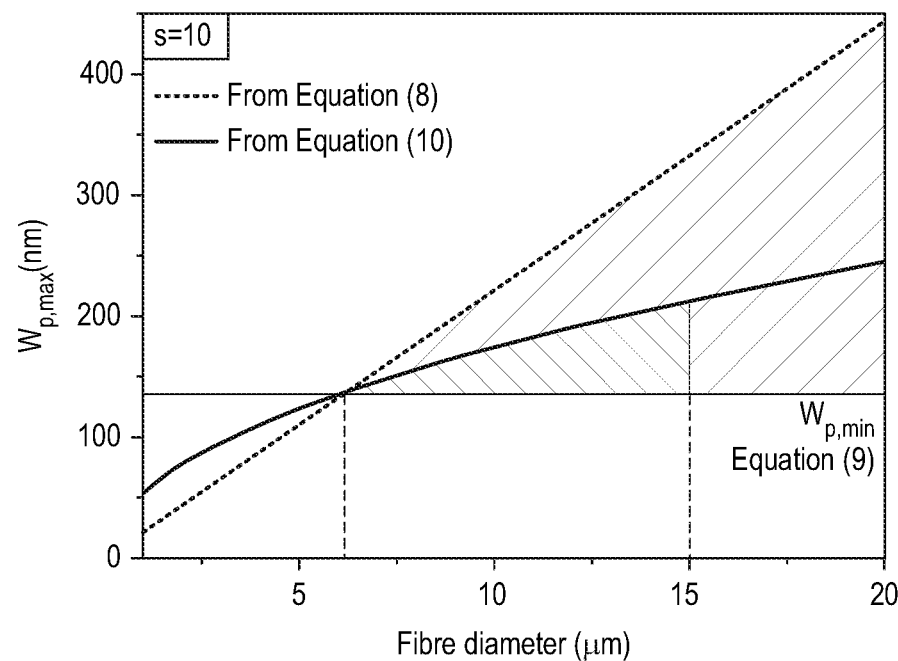

A decrease in fiber diameter, as well as an increase in platelet anisotropy (higher s), shift the platelet maximum width towards smaller values (FIG. 13.A). Typically, the diameter of a reinforcing fiber is in the range of 5 to 15 μm (5 to 10 μm and 10 to 15 μm for carbon and glass fibers, respectively). At a given platelet aspect ratio, there is a narrow range of acceptable dimensions that are most suitable for coating reinforcing fibers. Within this diameter range, the darkly shaded region in FIG. 13B highlights the platelet sizes for a fixed polymer layer of a 1.5 nm (such as is obtained by molecular self-assembly) as described in equation (5); the maximum platelet dimensions of about 13.5×135 nm and 21.5×215 nm (thickness×width) should be used for fiber diameters of 6 and 15 μm, respectively. The more lightly shaded region in FIG. 13B highlights the range of platelet dimensions that can be used if thicker polymer layers can be used (equation (3)).

The invention claimed is:

1. A coated fiber comprising a fiber and a coating, wherein the coating comprises nanoplatelets and a polymer, wherein the coating has a layered structure comprising at least two bilayers, each bilayer comprising a nanoplatelet layer and a polymer layer;
wherein the nanoplatelets have an average width less than or equal to $W_{p,max}$, wherein $W_{p,max}$ is a maximum platelet width that is determined according to the formula:

$$w_{p,max} = 2r.\arccos\left(\frac{r}{r + \Delta d_{polymer}}\right) \quad (1)$$

wherein r is the fiber diameter in nanometers, and $\Delta d_{polymer}$ is half the thickness of the polymer layer.

2. The coated fiber of claim 1, wherein the nanoplatelet and polymer layers are alternating and the coating comprises at least 10 bilayers.

3. The coated fiber of claim 1, wherein the nanoplatelet layer is a nanoplatelet monolayer.

4. The coated fiber of claim 1, wherein the polymer of the coating is a polyelectrolyte.

5. The coated fiber of claim 4, wherein the polyelectrolyte is a polyanionic polymer selected from the group consisting of poly(styrene sulfonate), poly(acrylic acid), poly(methacrylic acid), poly(vinyl sulfonate), poly(phosphoric acid), poly(vinylphosphoric acid), poly(phosphonic acid), poly(vinylphosphonic acid), and a combination thereof.

6. The coated fiber of claim 5, wherein the polyanionic polymer is poly(sodium 4-styrenesulfonate).

7. The coated fiber of claim 1, wherein the nanoplatelets comprise inorganic material selected from the group consisting of magnesium oxide (MgO), aluminium oxide ($Al_2O_3$), silicon dioxide ($SiO_2$), a silicate, an aluminosilicate, titanium dioxide ($TiO_2$), silicon carbide (SiC), carbon nitride ($C_3N_4$), silicon nitride ($Si_3N_4$), graphene, a metal carbide, an MXene, a layered double hydroxide and a combination thereof.

8. The coated fiber of claim 7, wherein the nanoplatelets comprise a layered double hydroxide of general formula $[Mg_2Al(OH)_6]CO_3 \cdot yH_2O$, wherein y is a variable amount of water.

9. The coated fiber of claim 1, wherein the coated fiber further comprises a precursor layer, wherein said precursor layer is disposed between the fiber and the coating.

10. The coated fiber of claim 9, wherein the precursor layer comprises a polymer.

11. The coated fiber of claim 10, wherein the polymer of the precursor layer comprises a polyelectrolyte.

12. The coated fiber of claim 11, wherein the polyelectrolyte is a polycationic polymer.

13. The coated fiber of claim 12, wherein the polycationic polymer is poly(diallyldimethylammonium chloride) (PDDA).

14. The coated fiber of claim 1, wherein $$w_{p,max} = 2r.\arccos\left(\frac{r}{r + 0.75 \text{ nm}}\right).$$

15. The coated fiber of claim 1, wherein the fiber has a diameter in the range of about 5-20 μm.

16. The coated fiber of claim 1, wherein the nanoplatelets have an aspect ratio of at least about 5 and up to a maximum of about 45.

17. The coated fiber of claim 16, wherein the nanoplatelets have an aspect ratio of about 7 to about 12.

18. The coated fiber of claim 17, wherein the aspect ratio is lower than the critical value, $s_c$, as described below, $$s_c = \frac{\sigma_p}{\tau_y}$$

where $\sigma_p$ and $\tau_y$ are the platelet tensile stress and interface yield shear strength, respectively.

19. The coated fiber of claim 1, wherein the nanoplatelets have an average width of from about 100 nm to about 500 nm and an average thickness of from about 10 nm to about 30 nm.

20. The coated fiber of claim 1, wherein the nanoplatelets have a width size distribution which has a standard deviation of less than 40% and/or a thickness size distribution which has a standard deviation of less than 20%.

21. The coated fiber of claim 1, wherein the nanoplatelets have a thickness of about 10 nm to about 50 nm, and wherein the nanoplatelets have an average lateral width of from about 20 nm to about 500 nm.

22. A coated fiber comprising a fiber and a coating, wherein the coating comprises nanoplatelets and a polymer, wherein the coating has a layered structure comprising at least two bilayers, each bilayer comprising a nanoplatelet layer and a polymer layer;
wherein the fiber has a diameter of 5-10 μm, and wherein the nanoplatelets have an average width of no more than 200 nm and an aspect ratio of 7 to 12.

23. The coated fiber of claim 1, wherein the volume ratio of nanoplatelet to polymer is about 80:20 to about 95:5.

24. A coated fiber comprising a fiber and a coating, wherein the coating comprises nanoplatelets and a polyelectrolyte, wherein the coating has a layered structure comprising at least two bilayers, each bilayer comprising a nanoplatelet layer and a polyelectrolyte layer;
wherein the coating comprises a volume ratio of nanoplatelets to polyelectrolyte of 80:20 to about 95:5 and a nanoplatelet aspect ratio of 8 to 10, and wherein the nanoplatelets have a size distribution of the width of the nanoplatelets with a standard deviation of less than about 40%.

25. The coated fiber of claim 1, wherein the fiber is a glass fiber, carbon fiber, aramid fiber, polyoxazole fiber, vectran fiber, basalt fiber, alumina fiber, silicon carbide fiber, piezoelectric fiber, optical fiber or ceramic fiber.

26. A composite material comprising a plurality of coated fibers of claim 1 and a matrix, wherein the matrix comprises an epoxy resin.

27. A method of preparing a coated fiber, comprising the steps of:
(a) providing a fiber; and
(b) coating the fiber with a coating comprising nanoplatelets and a polymer, wherein the fiber is coated with at least two bilayers, each bilayer comprising a nanoplatelet layer and a polymer layer, wherein the nanoplatelets have an average width less than or equal to $W_{p,max}$, wherein $W_{p,max}$ is a maximum platelet width that is determined according to the formula:

$$w_{p,max} = 2r \cdot \arccos\left(\frac{r}{r * \Delta d_{polymer}}\right) \quad (1)$$

wherein r is the fiber diameter in nanometers, and $\Delta d_{polymer}$ is half the thickness of the polymer layer.

28. The method of claim 27, wherein in step (b) a plurality of alternating polymer and nanoplatelet layers are deposited to form at least 10 bilayers.

29. The method of claim 27, wherein the layers are deposited by a layer-by-layer assembly.

30. The method of claim 29 wherein the method comprises performing layer-by-layer assembly on a plurality of fibers.

31. The method of claim 30, wherein the method of performing layer-by-layer assembly is performed continuously on a fiber line.

32. The method of claim 27, further comprising pre-treating the fiber prior to coating the fiber.

33. The method of claim 32, wherein pre-treating the fiber comprises:
(a) desizing the fiber;
(b) treating the fiber with an oxidizing agent;
(c) coating the fiber with a polymer to form a precursor layer, and/or
(d) treating the fiber with a covalent functionalizing agent.

34. A method of preparing a composite material, comprising embedding a plurality of coated fibers according to claim 1 within a matrix.

35. The method of claim 33, wherein the precursor layer comprises poly(diallyldimethylammonium chloride).

36. The coated fiber of claim 24, wherein the polyelectrolyte is a polyanionic polymer selected from the group consisting of poly(styrene sulfonate), poly(acrylic acid), poly(methacrylic acid), poly(vinyl sulfonate), poly(phosphoric acid), poly(vinylphosphoric acid), poly(phosphonic acid), poly(vinylphosphonic acid), and a combination thereof.

* * * * *